(12) United States Patent
Eastin et al.

(10) Patent No.: US 11,089,809 B1
(45) Date of Patent: Aug. 17, 2021

(54) DROPLET FOR FOOD APPLICATIONS

(71) Applicant: Kamterter Products, LLC, Waverly, NE (US)

(72) Inventors: John Alvin Eastin, Waverly, NE (US); David Vu, Waverly, NE (US)

(73) Assignee: Kamterter Products, LLC, Waverly, NE (US)

( * ) Notice: Subject to any disclaimer, the term of this patent is extended or adjusted under 35 U.S.C. 154(b) by 0 days.

(21) Appl. No.: 15/973,326

(22) Filed: May 7, 2018

Related U.S. Application Data

(60) Provisional application No. 62/502,138, filed on May 5, 2017.

(51) Int. Cl.
| | |
|---|---|
| *A23P 20/10* | (2016.01) |
| *A23P 10/35* | (2016.01) |
| *A23J 7/00* | (2006.01) |
| *A23P 10/30* | (2016.01) |

(52) U.S. Cl.
CPC .............. *A23P 20/11* (2016.08); *A23J 7/00* (2013.01); *A23P 10/35* (2016.08); *A23P 10/30* (2016.08); *A23P 20/10* (2016.08)

(58) Field of Classification Search
CPC .............. A23P 10/35; A23P 20/11; A23J 7/00
USPC ......................................................... 426/89
See application file for complete search history.

(56) References Cited

U.S. PATENT DOCUMENTS

| | | | | |
|---|---|---|---|---|
| 3,985,913 | A | * | 10/1976 | Johnson .................. A23P 10/30 426/650 |
| 4,271,142 | A | * | 6/1981 | Puglia .................... A61K 9/209 424/440 |
| 2008/0317824 | A1 | * | 12/2008 | Wonschik ............ A61K 9/4858 424/439 |
| 2014/0234411 | A1 | * | 8/2014 | Kamaguchi ............. A23L 27/72 424/455 |

FOREIGN PATENT DOCUMENTS

| | | | | |
|---|---|---|---|---|
| WO | WO-2010065006 A1 | * | 6/2010 | ............... A61J 3/07 |
| WO | WO-2013047376 A1 | * | 4/2013 | ........... A61K 9/4825 |

* cited by examiner

*Primary Examiner* — Jyoti Chawla
(74) *Attorney, Agent, or Firm* — Suiter Swantz pc llo

(57) ABSTRACT

A droplet having an inner portion and an outer portion is formulated using fluid drilling or a pulse dampened pump. The inner portion of the droplet includes higher activity, lability, volatility, miscibility, or solubility, while the outer portion of the droplet includes higher viscosity, increased barrier properties, or controlled-release properties. Surfactants, emulsifying agents, or penetrants may be added to improve delivery, controlled-release, shelf-life, flavor, aroma, texture, or consistency.

13 Claims, 16 Drawing Sheets

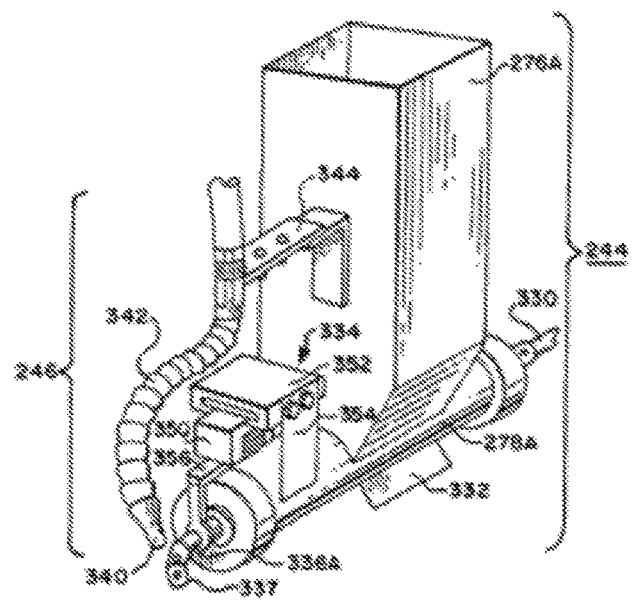
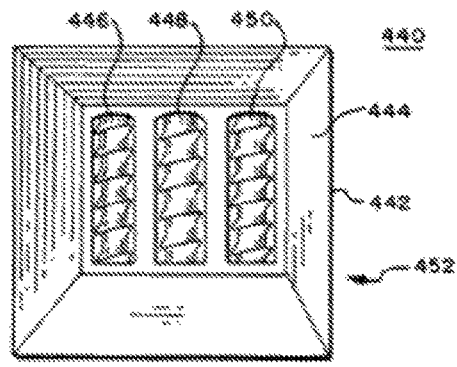
FIG. 8
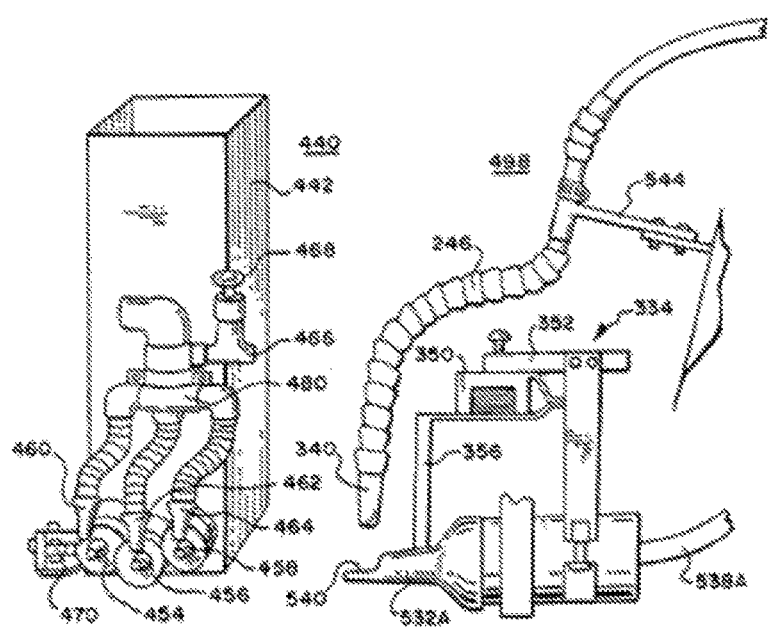

DROPLET FOR FOOD APPLICATIONS

TECHNICAL FIELD

The present invention generally relates to the food industry, and, in particular, a droplet having food ingredients.

BACKGROUND

In the food industry, fluids are often delivered on a macro level to food surfaces, cooking surfaces, nozzles, ovens, and mixers. The fluids may be delivered as ingredients, preservatives, flavor enhancers, dispersions, suspensions, or emulsions, and other similar applications.

Fluids may be labile, volatile, or immiscible, or have ingredients with these characteristics. Handling of fluids or ingredients with these characteristics is tedious and time consuming, as great care must be given to prevent loss or delay delivery so that the foods maintain maximum flavor, aroma, shelf-life, texture, and consistency. The use of high pressure is often employed in delivery, however, this high pressure may detrimentally affect the flavor, aroma, shelf-life, texture, and consistency.

On a micro level, encapsulation is often employed. However, current encapsulated droplets are often produced at high pressures, resulting increased power consumption for the formulation of the droplet. Further, the droplet structure is insufficient to provide adequate spreading, accurate controlled release, or desired adhesion, penetration, and/or barrier properties.

Therefore, it would be desirable to provide droplets, devices, systems, and methods that cure the deficiencies of prior approaches.

SUMMARY

Brief Description of the Drawings

The numerous advantages of the present invention may be better understood by those skilled in the art by reference to the accompanying figures in which:

FIG. 1A-12 illustrate a method and system for forming a droplet for food applications, in accordance with one or more embodiments of the present disclosure.

DETAILED DESCRIPTION

Figure 1A:
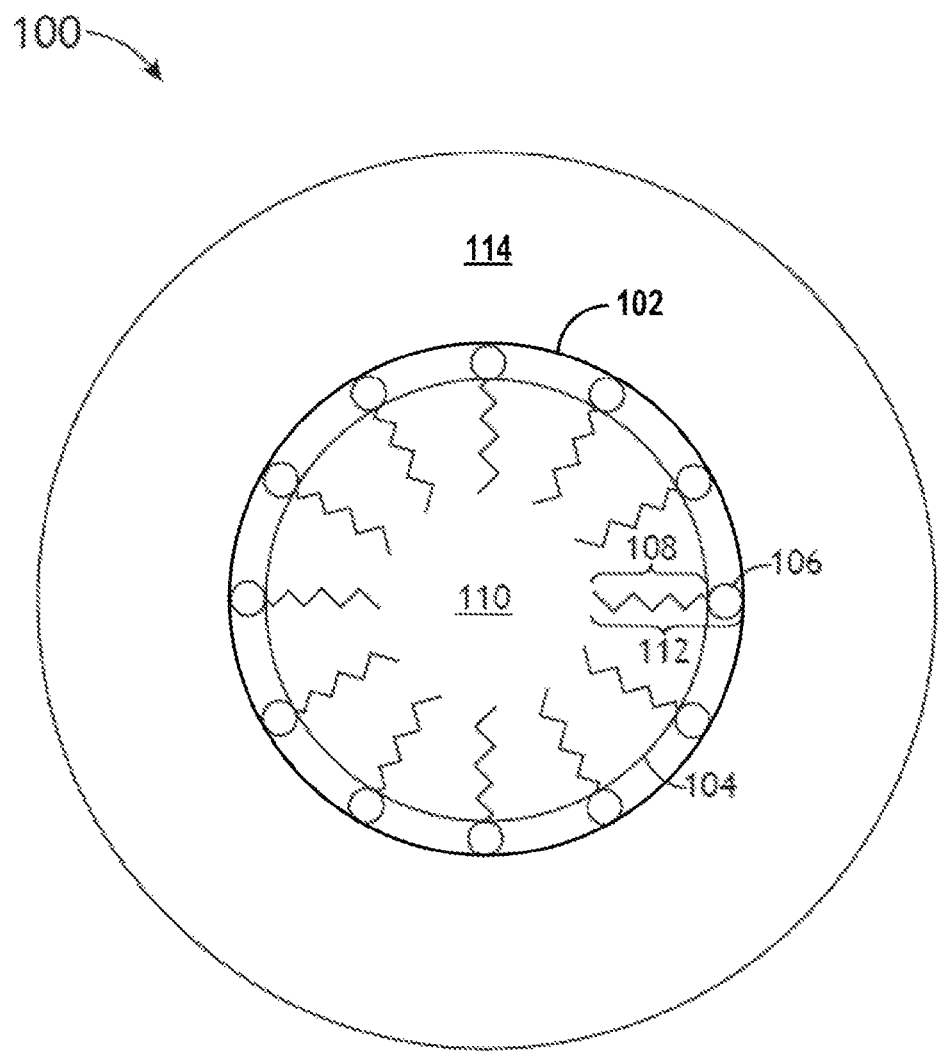

Reference will now be made in detail to the subject matter disclosed, which is illustrated in the accompanying drawings. The scope of this disclosure is limited only by the claims; numerous alternatives, modifications and equivalents are encompassed. The use of "or" is meant to be inclusive, unless otherwise indicated. Additionally, when used herein to join items in a list, "or" denotes "at least one of the items," but does not exclude a plurality of items in the list. For the purpose of clarity, technical material that is known in the technical fields related to the embodiments has not been described in detail to avoid unnecessarily obscuring the description.

Accordingly, while the present invention is described in detail in relation to one or more embodiments, it is to be understood that this disclosure is illustrative and exemplary of the present invention, and is made merely for the purposes of providing a full and enabling disclosure of the present invention. The detailed disclosure of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

"Hydrophilic" or "hydrophile" as used herein shall mean a molecule or other molecular entity that is attracted to water molecules and tends to be dissolved by water.

"Hydrophobic" or "hydrophobe" as used herein shall mean a molecule or other molecular entity that is not attracted to water molecules.

"Colloid" as used herein shall mean particles dispersed throughout another substance which are too small for resolution with an ordinary light microscope but are incapable of passing through a semipermeable membrane.

"Micelle" or "micella" as used herein shall mean an aggregate (i.e., supramolecular assembly) of surfactant molecules dispersed in a liquid colloid.

"Critical micelle concentration (CMC)" as used herein shall mean the concentration of surfactants above which micelles form and all additional surfactants added to the composition go to micelles.

"Zwitterion" as used herein shall mean a neutral molecule with both positive and negative electric charges.

"Amphiphile" as used herein shall mean a molecule with both hydrophilic and hydrophobic properties.

"Surfactant" as used herein shall mean a compound that lowers the surface tension between two liquids or between a liquid and a solid.

"Viscosity" as used herein shall mean dynamic viscosity measured at room temperature (e.g., 20° C.) unless specifically specified otherwise.

"Extensional viscosity (i.e., elongational viscosity)" as used herein shall mean a measure of a fluid's ability to stretch under elongational stress. In other words, extensional viscosity is a viscosity coefficient when applied stress is extensional stress.

"Labile" as used herein shall mean ingredients, components, particles, and/or fluids that are susceptible to changing state or losing a beneficial characteristic after prolonged contact with another ingredient, component, particle, and/or fluid. For example, dried or powdered milk is a labile ingredient that loses a preservative characteristic when subjected to prolonged moisture or water exposure.

"Phenolic compound" as used herein shall mean an edible compound containing a phenyl group, an aromatic ring, or a benzene ring. A class of phenolic compounds are secondary metabolites in plants. For example, the term includes, but is not limited to, benzoquinones, phenolic acids, acetophenones, phenylacetic acids, hydroxycinnamic acids, hydrobenzoic acids, phenylpropenes, coumarins, isocoumarins, chromones, napthoquinones, procyanidins, xanthones, estilbenes, anthraquinones, flavonoids, tannins, lignans, neolignans, and lignins.

"Solubility" as used herein shall mean solubility in water, unless specifically specified otherwise, at 25° C. Solubility may be determined according to one of many standardized tests. For example, in embodiments solubility is determined using a shake flask method (e.g., excess quantity added to solvent in a capped glass vial, agitated for period of time, then centrifuged).

"Specific gravity" as used herein is measured with respect to the density of water at 4° C. (e.g., 1 g/cm3).

"High viscosity" or "highly viscous fluids" as used herein includes fluids having a viscosity within the range of 0.8, inclusive to 10 kg/m·s (800 to 10,000 cP), inclusive. In some embodiments, the high viscosity fluids may be higher than 10 kg/m·s (e.g., chocolate, ketchup, mustard, sour cream, or peanut butter). Examples of fluids having high viscosity include dispersions, suspensions, or emulsions. For instance, glycerol having an apparent viscosity of 1.412 kg/m·s (1412 cP) may be considered a high viscosity fluid. Corresponding yield stress, $\tau$, will vary depending on the fluid, but generally ranges from 10-200 Pa.

"Medium viscosity" with respect to fluids, includes a fluid having a viscosity within the range of 0.002, inclusive to 0.08 kg/m·s (2.0 to 80 cP), exclusive. Examples of fluids having medium viscosity include fish oil and vegetable oils. In some embodiments, a medium viscosity fluid is from 1 cP, inclusive, to 800 cP, exclusive.

"Low viscosity" with respect to fluids, includes a fluid having a viscosity within the range of $0.97 \times 10^{-5}$ to 0.002 kg/m·s (0.0097 to 2.0 cP). Examples of fluids having low viscosity include air, nitrogen, and Xenon. In some embodiments, a low viscosity fluid is from 0.0097 cP, inclusive, to 2 cP, exclusive.

"Emulsifying agent" as used herein includes a substance that has hydrophobic and hydrophilic properties, allowing dissolution of the substance in fatty or oily solutions and in aqueous solutions. The term shall encompass food related emulsifying agents, including but not limited to, esters of fatty acids, organic esters, sulfonates, salts of sulfonates, protein condensates, fatty acid amines, fatty amine condensates, amine salts of sulfonic acids, esters of sodium sulfosuccinic acid, and combinations thereof. For instance, food-related emulsifying agents include but are not limited to, acacia, acetic and fatty acid esters of glycerol, acetylated distarch phosphate, acetylated monoglycerides, agar, alginic acid, ammonium alginate, calcium alginate, ammonium Salts of phosphatidic acid, calcium polyphosphates, stearate, stearoyl lactylate, carrageenan, cholic acid, diacetyl tartaric acid esters of mono- and diglycerides, dioctyl sodium sulfosuccinate, gelatin, pectin, ethyl hydroxyethyl cellulose, guar gum, lecithin, karaya gum, xanthan gum, a casein, a whey protein, and combinations thereof.

"Encapsulation" as used herein includes a method/process for distributing (e.g., entrapping) a first fluid component (e.g., low viscosity fluid) within a second fluid component (e.g., medium to high viscosity fluid, carrier, amphiphilic component, or combinations thereof). In embodiments, this delivery of the first component within a second component may delay delivery, partially isolate, encircle, or surround a the first component of a feedstock material within a coating or a shell, affect a reaction rate of the first component, and combinations thereof. For instance, a result of encapsulation may include improving a delayed or controlled release characteristic, improving a preservation characteristic (e.g., by providing a barrier between the first component and one or more reactants), generating particles with a size of a few nanometers or millimeters, and combinations thereof.

"Newtonian fluid" a fluid that obey Newton's law of viscosity, represented as follows:

$$\tau = \mu \frac{dV}{dy}$$

or in other words, where the shear stress, $\tau(N/m^2)$, is linearly proportional to the velocity gradient dV/dy, and where $\mu$ is dynamic viscosity $(Ns/m^2)$, dV is unit velocity (m/s), and dy is unit distance between layers (m).

"Non-Newtonian fluid" as used herein shall mean fluids that contain suspended particles or dissolved molecules. This term may include, but is not limited to, Bingham fluids, pseudoplastic fluids, dilatant fluids, thixotropic fluids, and viscoelastic fluids. The term shall include, but is not limited to, fluids whose characteristics are represented by the Ostwald-de Waele equation as follows:

$$\tau = K\left(\frac{dV}{dy}\right)n$$

where K (often in $kg/ms^{2-n}$) and n (dimensionless) are constants determined by experimental fitting data. Generally, for pseudoplastic fluids, n is less than 1 and for dilatant fluids n is greater than 1.

Broadly, droplets are disclosed having an inner and outer portion. The outer portion has a higher viscosity than the inner portion, while the inner portion has higher lability, volatility, miscibility, solubility, or combinations thereof. In some embodiments, the inner portion also has a higher density (e.g., specific gravity) than the outer portion. In some embodiments, the portions are reversed, such that the properties of the inner portion are available as an outer portion.

In embodiments, a droplet 100 may be formed after adjusting one or more properties of a solution or a fluid, including but not limited to, solvent quality, temperature, pH, or ionic strength. In embodiments, the adjusted property or properties may be a dominant stabilizing mechanism for an emulsion.

Referring now to FIG. 1 an embodiment of a droplet 100 for food additives, ingredients, or metabolic input, includes a coating 102 (e.g., outer portion) and a core 104 (e.g., inner portion). For example, the coating 102 may make up the outer most layer of the droplet 100 by surrounding the core 104. For instance, the coating 102 may include an encapsulating membrane, a shell, carrier material, a non-Newtonian fluid, a non-polar portion, a lipophilic portion, an immiscible portion, a high viscosity fluid, or combinations thereof. The core 104 may include a polar portion, a hydrophilic portion, an active agent/ingredient, a volatile ingredient, a labile ingredient, or combinations thereof. The core 104 may be of a mono-core or a poly-/multiple-core type. In some embodiments, the droplet 100 includes a micelle structure.

In some embodiments, the coating 102 may include a high viscosity fluid. For example, the high viscosity fluid may include glycerol from about 90 to 100 wt. % aqueous glycerol solution, having corresponding viscosities at about 20° C. from 109 to 1412 cP. By way of other examples, the high viscosity fluid may include linseed oil at about 33 cP, caster oil at about 650 to 1,000 cP, karo syrup at about 5,000 cP, honey at about 10,000 cP, chocolate at about 25,000 cP, ketchup at about 50,000 cP, mustard at about 70,000 cP, sour cream at about 100,000 cP, peanut butter at about 250,000 cP, or combinations thereof (each measured at about 20° C.).

In some embodiments, the coating 102 may include a non-Newtonian fluid. For example, coating 102 of droplet 100 may include one or more solid particles (e.g., spices such as thyme, coriander, etc.) and when multiple droplets 100 are sprayed they may result in a flavor slurry. In other embodiments, the solid particles may be within the core 104.

In embodiments, the coating 102 may include one or more linear or branched hydrocarbons. For example, compounds having linear or branched hydrocarbons making up the coating 102 may include glycerol, caster oil (e.g., olio di ricino), olive oil, or a milk-based compound/emulsion.

In embodiments, coating 102 may include a hydrophilic head 106 facing away from the core 104 and a hydrophobic tail 108 interacting with the hydrophobic portion 110. In some embodiments, the portion of the droplet having both a hydrophilic head 106 and a hydrophobic tail 108 is an amphiphile 112 (e.g., amphiphilic hydrocolloid). It is noted that the configuration of droplet 100 may vary depending on a number of factors including a type of solution within which droplet 100 is formed. The configuration of droplet 100 is shown with hydrophilic head 106 facing toward aqueous solution 114.

In some embodiments, the coating 102 may include a hydrophobic or lipophilic portion 110. For example, oils (e.g., rapeseed oil, palm oil, olive oil, etc.) are often used in cooking as a lubricant, barrier, in slurry sprays, or other such uses. The hydrophobic portion 110 may have properties that are more beneficial if encapsulated or enclosed by an exterior of droplet 100 (e.g., coating 102). For example, the hydrophobic or lipophilic portion may have a higher vapor pressure, a higher melting or evaporation point, flavoring properties, or combinations thereof. In some embodiments, these properties are more beneficial to a food surface, shelf-life, texture, or a consumer, if they are delayed until they reach an active site (e.g., digestive tract).

In some embodiments, the coating 102 may include a medium to high viscosity fluid. For example, medium to high viscosity fluids may include oils, slurries, glazes, glycerol, emulsions, dispersions, suspensions, and combinations thereof. For instance, the oils may include vegetable oils including but not limited to, palm oil, coconut oil, corn oil, canola oil, soybean oil, olive oil, sunflower oil, rapeseed oil, peanut oil, or mixtures thereof.

In some embodiments, the medium to high viscosity fluid provides some or all of the delay of beneficial properties mentioned above. For instance, it is known that aspartame breaks down at higher temperatures and so in order to provide a barrier between an aspartame particle and certain cooking temperatures, a solid aspartame particle may be within droplet 100 (e.g., encapsulated, enclosed, entrapped, etc.) to reduce or prevent the breaking down of the aspartame particle at the temperatures.

In some embodiments, the coating 102 may include fluids (e.g., non-Newtonian) having a boiling point within a specified range. For example, the coating 102 may include fluids having a boiling point within a range of 105° C. to 300° C., inclusive. For instance, the coating 102 may include lauric acid having a boiling point at about 225° C. By way of another example, the coating 102 may include a fluid having a boiling point within a range of 250° C. to 300° C., inclusive. For instance the coating 102 may include glycerol having a boiling point at 290° C.

In some embodiments, the coating 102 of the droplet 100 may include an element or compound having a density or a specific gravity from a selected range. For example, the coating 102 may include a compound having a specific gravity in the range of about 1 to 2 (e.g., lauric acid at about 0.88, vegetable oil—peanut at about 0.91, vegetable oil—coconut at about 0.92, caster oil at 0.96, whole milk at about 1.03, or glycerol at 1.26). By way of another example, the coating 102 may include an element/compound having a specific gravity in the range of 1.2 to 1.5 (e.g., corn syrup at about 1.38 or honey at about 1.42).

In some embodiments, the coating 102 may include a surfactant. For example, the coating 102 may include a naturally occurring surfactant such as lecithin. By way of another example, the coating 102 may include a synthetic surfactant such as sucrose esters or sorbitan esters and their ethoxylates. Other surfactants in the coating 102 may include, but are not limited to, saponins, glycolipids, fatty alcohols, and fatty acids. In embodiments, the selection of a proper surfactant may be according to Bancroft's rule (e.g., oil-soluble surfactant may stabilize water-in-oil emulsion, while water-soluble surfactant may stabilize oil-in-water emulsion). In some embodiments, a concentration of the surfactant is increased until the CMC is obtained.

In some embodiments, the coating 102 may include a zwitterionic compound (e.g., lecithin, etc.). In other embodiments, the coating 102 may include a cationic compound (e.g., lauric arginate, etc.). While in yet other embodiments, the coating 102 may include a nonionic compound (e.g., monoglycerides, acetic acid ester of mono-glyceride (ACETEM), etc.). In yet other embodiments, the coating 102 may include an anionic compound (e.g., stearoyl lactylate salts, fatty acid salts, diacetyl tartaric acid esters of monoglycerides (DATEM), etc.).

In some embodiments, the coating 102 may include an emulsifying agent. In embodiments, the emulsifying agent is selected based on an ability to absorb to a surface of a droplet formed during and/or soon after emulsion formation. In other embodiments, the emulsifying agent is selected based on an ability to reduce interfacial tension.

In some embodiments, the coating 102 of the droplet 100 may include an element or compound having a vapor pressure from a selected range. For example, the selected range may be from less than 1 to 40.0 mm Hg at about 25° C. to about 80° C. For instance, the coating 102 may include glycerol having a vapor pressure at about $1.68 \times 10^{-4}$ mm Hg at about 25° C., caster oil having a vapor pressure at about 1.4 mm Hg at about 25° C., soybean oil having a vapor pressure at about 3.4 mm Hg at about 25° C., a fatty acid ethyl ester mixture (FAEE) at about 36.4 mm Hg at about 25° C., or combinations thereof.

In embodiments, the core 104 may include a low viscosity fluid. For example, the low viscosity fluid may include acetic acid having a viscosity at about 25° C. of 0.001155 kg/m·s (1.155 cP). By way of another example, the low viscosity fluid may include ethanol at about 1.095 cP. By way of other examples, the low viscosity fluid may include some flavor enhancers including, but not limited to, coumarin, vanillin, and ethylvanillin.

In embodiments, the core 104 may include one or more low to medium viscosity fluids. In other embodiments, the core 104 includes only low viscosity fluid(s). In some embodiments, the core 104 preferably includes an element or compound having a vapor pressure that is greater than a vapor pressure of the coating 102. In other embodiments, the core 104 includes an element or compound having a vapor pressure that is less than a vapor pressure of the coating 102.

In some embodiments, the core 104 may include one or more phenol groups, according to the following:

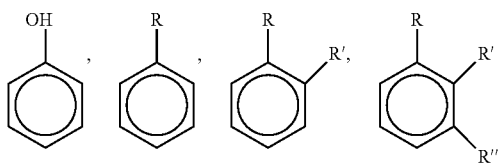

where the R, R', and/or R" group may be any element or compound that together with the phenyl group or benzene ring results a phenolic compound. For instance, the hydrophilic portion 102 may include, but is not limited to, a flavoring agent (e.g., benzyl alcohol, etc.), a flavonoid (e.g., rutin, quercetin, etc.), or mixture thereof.

In embodiments, the core 104 may include a volatile hydroxyl group, according to the following:

where the R group may be any element or compound that together with the hydroxyl group results a volatile or labile compound. For example, ethanol, 1-heptanol, isobutyric acid, isovaleric acid, or similar compounds may be included in, or primarily formulate (e.g., found in quantities greater than 50 wt. %), the core 104.

In some embodiments, the core 104 of the droplet 100 may include an element or compound having a vapor pressure from a selected range. For example, the selected range may be from about less than 1 to 60.0 mm Hg at 25° C. For instance, the core 104 may include 3-hydroxyflavone having a vapor pressure of about 2.75×10^-9 mm Hg at 25° C., 1-heptanol having a vapor pressure at 0.22 mm Hg at 25° C., isovaleric acid having a vapor pressure at 0.44 mm Hg at 25° C., isobutyric acid having a vapor pressure at 1.81 mm Hg at 25° C., ethanol having a vapor pressure at 59.3 mm Hg at 25° C., or combinations thereof.

In some embodiments, the core 104 of the droplet 100 may include an element or compound having a solubility from a selected range. For example, the core 104 of the droplet 100 may include an element/compound having a solubility that is less than 1 mg/mL. For instance, the core 104 may include hesperidin at about 5 μg/mL, eriodictyol or eridictyol at 0.07 mg/mL at 20° C., ellagic acid at about 1.96×10^-5 mg/L, rutin at about 0.125 mg/mL, or combinations thereof. By way of another example, an element/compound of the core 104 may have a solubility that is from greater than or equal to 1 mg/mL (e.g.,) to about 70 mg/mL. For instance, the core 104 may include vanillin at 1.1 mg/mL at 25° C., naringin at about 1 mg/mL at 40° C., benzyl alcohol at 33 mg/mL, aspartame at about 13.5 to 20 mg/mL, quercetin at about 60 mg/mL at 16° C., or combinations thereof.

In some embodiments, the core 104 of the droplet 100 may include an element or compound having a density or a specific gravity from a selected range. For example, the core 104 may include a compound having a specific gravity in the range of about 1 to 2 (e.g., menthol at about 0.9, ellagic acid at 1.667, naringin and eriodictyol at about 1.7, and rutin at 1.82). By way of another example, the core 104 may include an element/compound having a specific gravity in the range of 1.5 to 1.9.

In some embodiments, the core 104 of the droplet 100 may include one or more ketone groups. For example, core 104 may include an element, molecule, or compound according to the following:

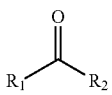

where the $R_1$ and $R_2$ group may be any element or compound that together with the ketone functional group results a compound having hydrophilic, slightly hydrophilic, labile, and/or volatile properties. For instance, the core 104 may include, but not limited to, a flavone, a flavanone, or similar flavonoid.

In some embodiments, the core 104 of the droplet 100 include one or more ether groups. For example, core 104 may include an element, molecule, or compound according to the following:

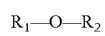

where the R1 and R2 group may be any element or compound that together with the ether functional group results a compound having hydrophilic, slightly hydrophilic, labile, and/or volatile properties. For instance, the core 104 may include one or more ether groups including, but not limited to, cellulose ethers, diphenyl ether, dibenzyl ether, diethyl ether (e.g., as a solvent), naphthyl ethers (e.g., ß-naphthyl methyl ether, ß-naphthyl ethyl ether, or ß-naphthyl isobutyl ether), methyl phenethyl ether, a polaxamer, or mixture thereof.

It is noted that while the coating 102 shown in FIG. 1A is depicted as a droplet composition surrounding one core 104 (e.g., hydrophilic portion), such a configuration is merely provided for illustrative purposes. The present disclosure may be configured to adapt a poly- or multi-core droplet, or droplet 100 may include more than one hydrophobic and/or hydrophilic portions to provide necessary physical properties to the composition of droplet 100. It is further noted that, while the droplet 100 shown in FIG. 1A is depicted to have approximately the same amount of the core 104 and the coating 102, such a configuration is merely provided for illustrative purposes. The present disclosure may be configured to have various ratios of the core 104 and the coating 102 to form the droplet 100. In general, in order to form normal micelles (i.e., an oil-in-water system) such as the droplet 100 shown in FIG. 1A, a ratio of the hydrophilic portion 106 to the hydrophobic portion 110 needs to be greater than 1 to 1.

In some embodiments, a volume of the core 104 of the droplet 100 to coating 102 of the droplet 100 may have a selected ratio. For example, the ratio of the core 104 to the coating 102 may be between 1 to 1 and 1 to 4 by volume.

In other embodiments, the coating 102 may include a hydrophilic portion 106 and the core 104 may include the hydrophobic portion 110 in a volume of between 1 to 1 and 4 to 1. For instance, the ratio of the hydrophilic portion 106 to the hydrophobic portion 110 may be between 2 to 1 and 3 to 1.

In embodiments, the droplet 100 is formed using amphiphile 112, and the shape or size of the droplet 100 may be estimated using a critical packing factor ($C_{pp}$), according to the following:

$$C_{pp} = V_0 / A_{mic} l_c$$

where $V_0$ is the effective volume occupied by hydrophobic chains in the droplet core (e.g., core 104), $l_c$ is the maximum effective length (e.g., critical chain length), and $A_{mic}$ is the effective hydrophilic head-group surface area at the droplet-solution interface. For example, as the $C_{pp}$ value increases, the droplet 100 may be spherical (e.g., $C_{pp} \leq 1/3$), cylindrical (e.g., $1/3 \leq C_{pp} \leq 1/2$), and/or lamellar ($C_{pp}=1$).

In some embodiments, amphiphile 112 may have non-polar, charged (i.e., polar cationic or anionic), or uncharged (i.e., polar nonionic or polar uncharged) properties. For instance, amphiphile 112 may include a polar uncharged functional group, including but not limited to, a hydroxy group (e.g., alcohols or water) and/or a carbonyl group (e.g., ketones, carboxylic acids, esters, etc.).

The amphiphile 112 may include a hydrophilic head 106 facing toward the coating 102 and a hydrophobic tail 108 interacting with the hydrophobic portion 110 of the droplet 100. The hydrophilic head 106 of the amphiphile 112 may be in contact with the surrounding coating 102. The hydrophilic head 106 of the amphiphile 112 may be nonionic, cationic, anionic, or zwitterionic. For instance, the nonionic hydrophilic head 106 of the amphiphile 112 may include, but is not limited to, alanine, phenylalanine, leucine, isoleucine, glyceryl laurate (monolaurin), polysorbate, poloxamers, polyoxyethylene sorbitan oleate (i.e., tween 80), polyoxyethylene sorbitabe monolaurate (i.e., tween 20), phospholipids, cholesterol, glycolipid, fatty acid, saponin, fatty alcohols, cetyl alcohol, stearyl alcohol, cetostearyl alcohol, oleyl alcohol, or combinations thereof. In this regard, the nonionic hydrophilic head 106 of the amphiphile 112 are equipped with long hydrocarbon chain alcohols (i.e., one or more uncharged hydroxy groups).

In some embodiments, the cationic hydrophilic head 106 of the amphiphile 112 may include, but is not limited to, cationic amphiphilic cyclodextrins (CADs) (e.g., thiolated carboxymethyl chitosan-g-ß-cyclodextrin), lauric arginate, hexadecylpyridinium chloride (HPC), arginine, lysine, tryptophane, or combinations thereof.

In some embodiments, the anionic hydrophilic head 106 of the amphiphile 112 may include, but is not limited to, aspartic acid, glutamic acid, an alkyl ester sulfate, or combinations thereof.

In some embodiments, the zwitterionic hydrophilic head 106 of the amphiphile 112 may include, but is not limited to, lecithin.

In some embodiments, the zwitterionic hydrophilic head 106 of the amphiphile 112 is selected from zwitterionic compounds with specific properties. For example, the zwitterionic hydrophilic head 106 may be selected from compounds having an amine or ammonium cation as a cationic center of the zwitterionic hydrophilic head 106 and sulfonates, carboxylates, or phosphates as an anionic center of the zwitterionic hydrophilic head 106.

Further, the hydrophobic tail 108 of the amphiphile 112 may be formed essentially from hydrocarbons. For example, the hydrocarbons of the hydrophobic tail 108 may be linear hydrocarbons. By way of another example, the hydrocarbons of the hydrophobic tail 108 may be branched hydrocarbons. By way of yet another example, the hydrocarbons of the hydrophobic tail 108 may be cyclic hydrocarbons. For instance, the cyclic hydrocarbons of the hydrophobic tail 108 may be aromatic hydrocarbons. It is noted that embodiments of the present disclosure may be configured to include various types of the hydrophobic tail 108 in the droplet 100 including, but not limited to, combinations of linear and branched hydrocarbons, linear and cyclic hydrocarbons, or branched and cyclic hydrocarbons. It is further noted that the hydrocarbons of the hydrophobic tail 108 may be fully saturated hydrocarbons, partially saturated hydrocarbons, or unsaturated hydrocarbons.

It is contemplated that, while the hydrophobic tail 108 depicted in FIG. 1A represents a linear hydrocarbon chain, such a configuration is merely provided for illustrative purposes. The present disclosure may be configured to include the hydrophobic tail 108 with a branched hydrocarbon chain, cyclic hydrocarbon chain, or combination thereof.

In embodiments, the droplet 100 includes a surfactant. The surfactant may adjust surface tension of a fluid surrounding a particle (e.g., sugar crystal, aspartame, etc.). For example, the surfactant may be amphiphile 112.

In embodiments, the surfactant may include a penetrant. For example, the surfactant may include but is not limited to a phospholipid. For instance, the phospholipid may include a phosphatidylserine, or a phosphatidycholine such as lecithin.

In embodiments, when a high viscosity fluid is used in the coating 102, a combined viscosity of the droplet 100 may have a selected range that is substantially equivalent to the viscosity of the high viscosity fluid. For example, the droplet 100 may have a combined viscosity in the range of 0.8 centipoise to 10,000 centipoise at 20° C. By way of another example, the droplet 100 may have a combined viscosity greater than 10,000 cP.

In some embodiments, a combined specific gravity of the droplet 100 may have a selected range. For example, the droplet 100 may have a combined specific gravity in the range of 2 to 4. For instance, the droplet 100 may have a combined specific gravity in the range of 2.7 to 3.4. In embodiments where a very high viscosity fluid is used in droplet 100 (e.g., chocolate, ketchup, mustard, or peanut butter), the combined specific gravity of the droplet 100 will be substantially equivalent to the specific gravity of the very high viscosity fluid.

In embodiments, a combined vapor pressure of the droplet 100 may depend on the components of the droplet, a temperature at which the vapor pressure is determined (e.g., process temperature), and a point at which the vapor pressure is determined (e.g., at formation or just prior to combustion). In embodiments, the vapor pressure may be calculated using an equation (e.g., Antoine Equation) or estimated using one or more diagrams (e.g., a p-T phase diagram, a reference substance plot, a Cox chart). For example, the droplet 200 may have as an exterior portion, the hydrophobic portion 210. If the hydrophobic portion 210 includes primarily 1-heptanol, then the vapor pressure of the droplet may be estimated to be about 0.22 mm Hg at 25° C.

It is noted that a micelle in the droplet 100 may form when a concentration of the amphiphile 112 is greater than the critical micelle concentration (CMC) and a temperature of the system is greater than the critical micelle temperature (i.e., Krafft temperature). It is further noted that the CMC of the droplet 100 may depend on a type of the amphiphile 112. For example, the CMC of the droplet 100 may be about $1.25 \times 10^{-4}$ M at 30° C. (or 500 μL of a 200 mg/mL P188 solution) when the droplet contains a non-ionic surfactant (e.g., Ethylene oxide/propylene oxide copolymer such as polaxamer 188).

It is noted that the shape and size of the micelle in the droplet 100 are a function of the molecular geometry of the amphiphile 112 and portion conditions such as, but not limited to, temperature, pH, and ionic strength between the molecules. The average sizes of micelles in the droplet may range from 2 nm to 20 nm depending on compositions and concentrations.

It is contemplated that, while the droplet 100 shown in FIG. 1A is a spherical in shape, such a configuration is merely provided for illustrative purposes. The present disclosure may be configured to adapt other micelle shapes including, but not limited to, ellipsoids, cylinders, and bilayers. It is further contemplated that, while the droplet 100 shown in FIG. 1A is shown as one droplet structure, such a configuration is merely provided for illustrative purposes. The present disclosure may be configured to include one or more packed micelle structures in the droplet 100, including, but not limited to, wedge-like shape, corn-like shape, or cylinder-like shape. Additionally, the droplet 100 may include more than one droplets fused together.

In some embodiments, the droplet 100 includes an extensional viscosity modifier to adjust viscosity (e.g., or viscosity coefficient) of the droplet 100. The extensional viscosity modifier may reduce evaporation of the droplet 100 and increase droplet diffusion. For example, the extensional viscosity modifier may be formed from one or more polymers. For instance, the one or more polymers of the extensional viscosity modifier may include, but is not limited to, polyethylene oxide (PEO), polyethylene glycol (PEG), carboxylmethylcellulose, or the like. In some embodiments, the extensional viscosity modifier is non-Newtonian fluid.

In embodiments, the droplet 100 includes one or more viscosity modifiers to adjust viscosity of the droplet 100. For example, the viscosity modifier may be used to increase a dynamic viscosity of a liquid. For instance, the viscosity modifier may be used to increase the viscosity of the coating 102 of the droplet 100 and/or the core 104 of the droplet 100.

In some embodiments, the viscosity modifier is formed from one or more polymers. For example, the one or more polymers of the viscosity modifier may include, but is not limited to, PEO, PEG, carboxylmethylcellulose, or combinations thereof. By way of another example, the viscosity modifier may include, but is not limited to, guar gum. In some embodiments, the viscosity modifier is formed from one or more copolymers.

In embodiments, the droplet 100 may be sprayed using an apparatus described in U.S. Pat. No. 9,148,994 issued on Oct. 6, 2015, filed Nov. 12, 2012, by John Alvin Eastin, et al., titled SYSTEMS FOR THE CONTROL AND USE OF FLUIDS AND PARTICLES, which is incorporated herein by reference in its entirety.

In embodiments, a droplet 150 may include a coating 102 forming the outer-most layer of the droplet 150, a hydrophobic portion 110 embedded inside the coating 102, an amphiphile 112 with a hydrophilic head 106 connected to a hydrophobic tail 108, and an internal component 124 resting in the hydrophobic portion 110. In embodiments, the internal component 124 is fluid-dynamically located, meaning that a location of the internal component 124 may be dictated by its properties and the properties of the surrounding fluids. For example, the internal component 124 may be located substantially at the center of the hydrophobic portion 110 of the droplet 150.

In some embodiments, the internal component 124 of the droplet 150 may be a solid particle capable of providing flavor enhancement. For example, the solid particle in the hydrophobic portion 110 may include, but is not limited to, a sugar crystal, aspartame, a spice (e.g., corriandor, thyme, etc.), or combinations thereof.

Figure 1B:
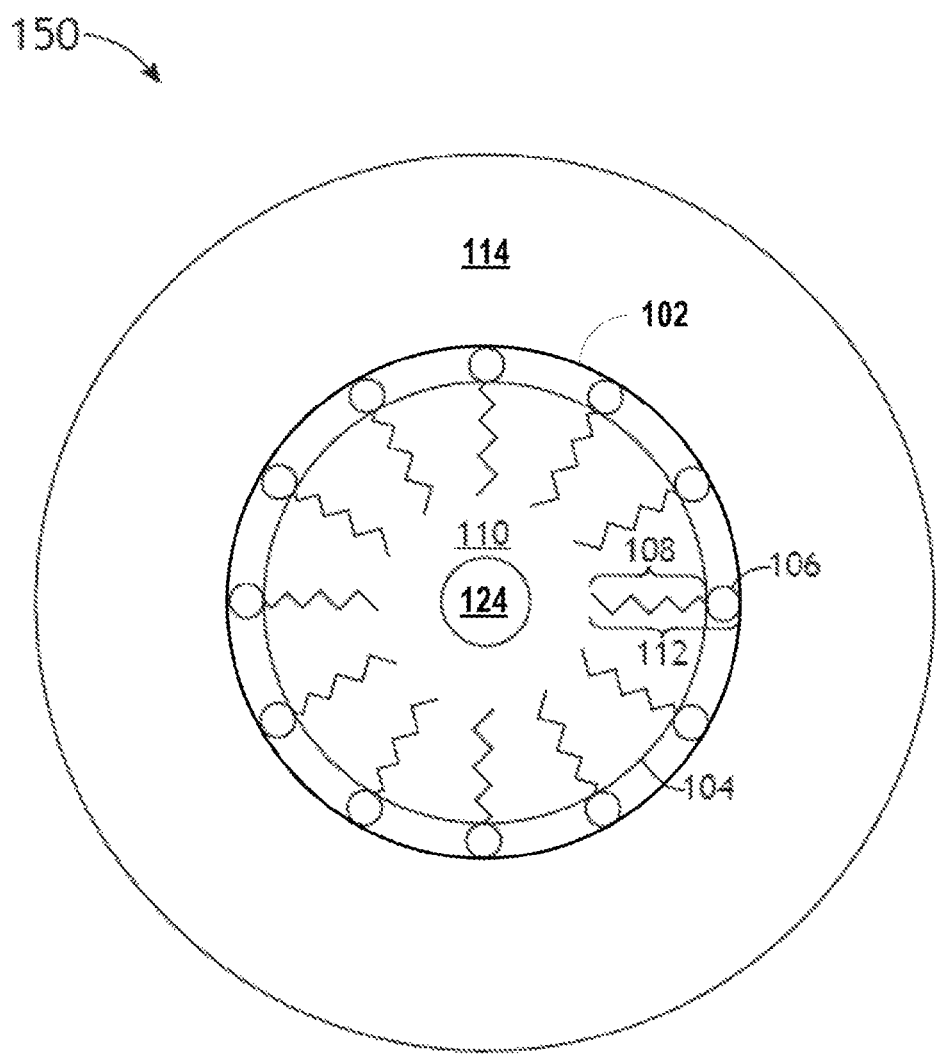

It is contemplated that, while the internal component 124 shown in FIG. 1B is represented as one site within the hydrophobic portion 102, such a configuration is merely provided for illustrative purposes. Embodiments of the present disclosure may be configured to include more than one sites for the internal component 124. It is further contemplated that, while the internal component 124 shown in FIG. 1B is substantially located at the center of the hydrophobic portion 110, such a configuration is merely provided for illustrative purposes. Embodiments of the present disclosure may be configured to adapt various locations for the internal component 124 in the hydrophobic portion 110.

It is contemplated that, while twelve amphiphiles 112 are shown in FIG. 1A, such a configuration is merely provided for illustrative purposes. Embodiments of the present disclosure may adapt any number of amphiphiles known in the art forming a stable micelle structure. It is further contemplated that, while one kind of amphiphile 112 is shown in FIG. 1A to form the micelle structure, such a configuration is merely provided for illustrative purposes. Embodiments of the present disclosure may be configured to include more than one kind of amphiphile to form the micelle structure.

In some embodiments, the internal component 124 shown in FIG. 1B may be soluble in the core 104 and the solubilized internal component 124 may stay within the core 104 of the droplet 150.

Figure 2A:
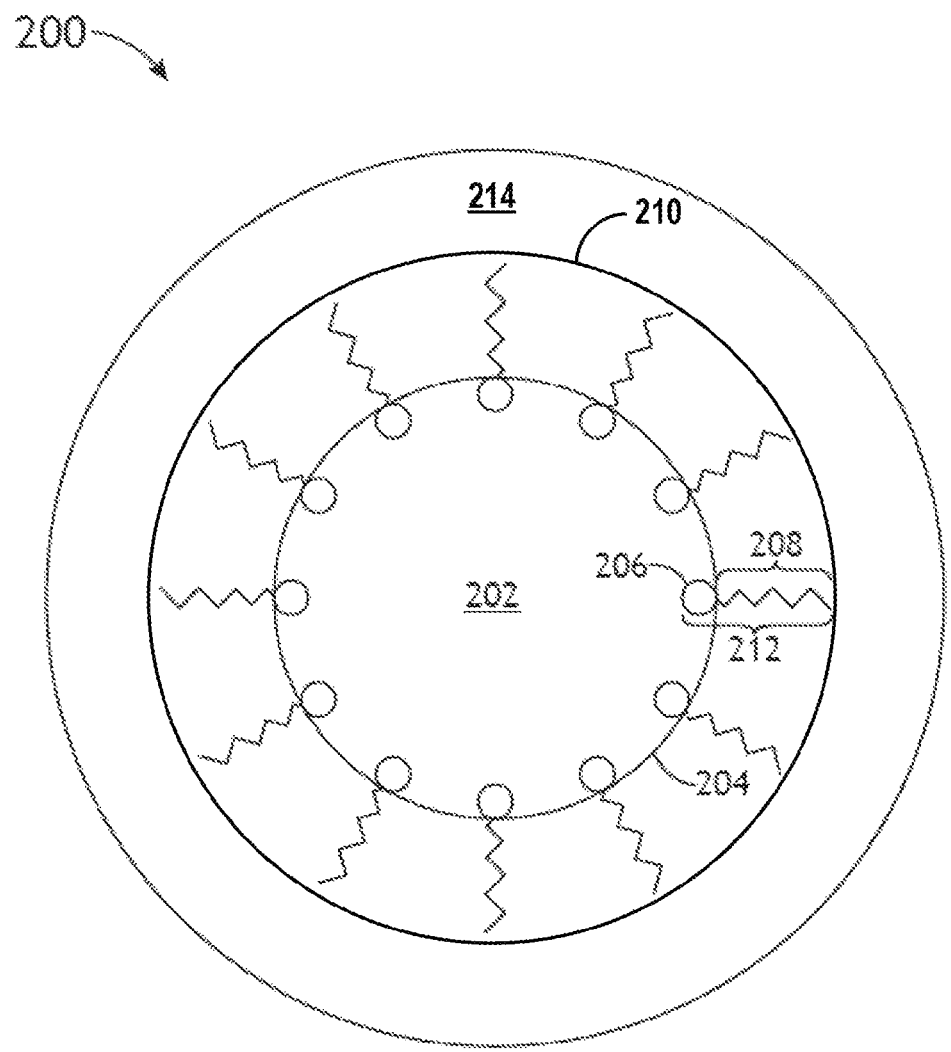

Now referring to FIG. 2A, a plan view of a droplet including a reverse micelle is disclosed, in accordance with one or more embodiments of the present disclosure. It is noted herein that the embodiments and components described previously herein with respect to the droplet 100 should be interpreted to extend to the embodiments described in FIG. 2A.

In embodiments, a droplet 200 represents a reverse micelle structure (i.e., inverse micelle or a water-in-oil system). The droplet 200 may include a hydrophobic portion 210 forming the most outer layer of the droplet 200. In some embodiments, the droplet 200 may include a hydrophilic portion 202 embedded inside the hydrophobic portion 210. In some embodiments, the droplet 200 may include an amphiphile 212 defining a layer 204 between the hydrophilic portion 202 and the hydrophobic portion 210. For example, the amphiphile 212 may be configured to form a hydrophilic head 206 connected to a hydrophobic tail 208. In this regard, the hydrophilic head 206 may be sequestered into the middle of the hydrophilic portion 202 and the hydrophobic tail 208 may extend away from the middle of the hydrophilic portion 202 and towards a nonaqueous solution 214.

In general, the reverse micelle (a water in-oil system) such as shown in FIG. 2A is particularly of interest in the food industry as it may improve or accelerate a supercritical fluid extraction of cholesterol from certain foods. Other applications include fractionation and purification, protein extraction from oils, and enzyme catalysis in non-polar lipids.

It is noted that one difference between the droplet 100 shown in FIG. 1A and the droplet 200 shown in FIG. 2A is the ratio of the hydrophilic and the hydrophobic portions. When the ratio of the hydrophilic portion to the hydrophobic portion is greater than 1 to 1 (i.e., the hydrophilic portion is present more than the hydrophobic solute), the normal micelle in the droplet 100 may be a preferred droplet. On the other hand, when the ratio of the hydrophilic portion to the hydrophobic portion is less than 1 to 1 (i.e., the hydrophilic solute is present less than the hydrophobic portion), the reverse micelle in the droplet 200 may be a preferred droplet.

It is further noted that the reverse micelles are proportionally less likely to form on increasing hydrophilic head charge, since the hydrophilic sequestration of the hydrophilic head 206 creates highly unfavorable electrostatic interactions.

Figure 2B:
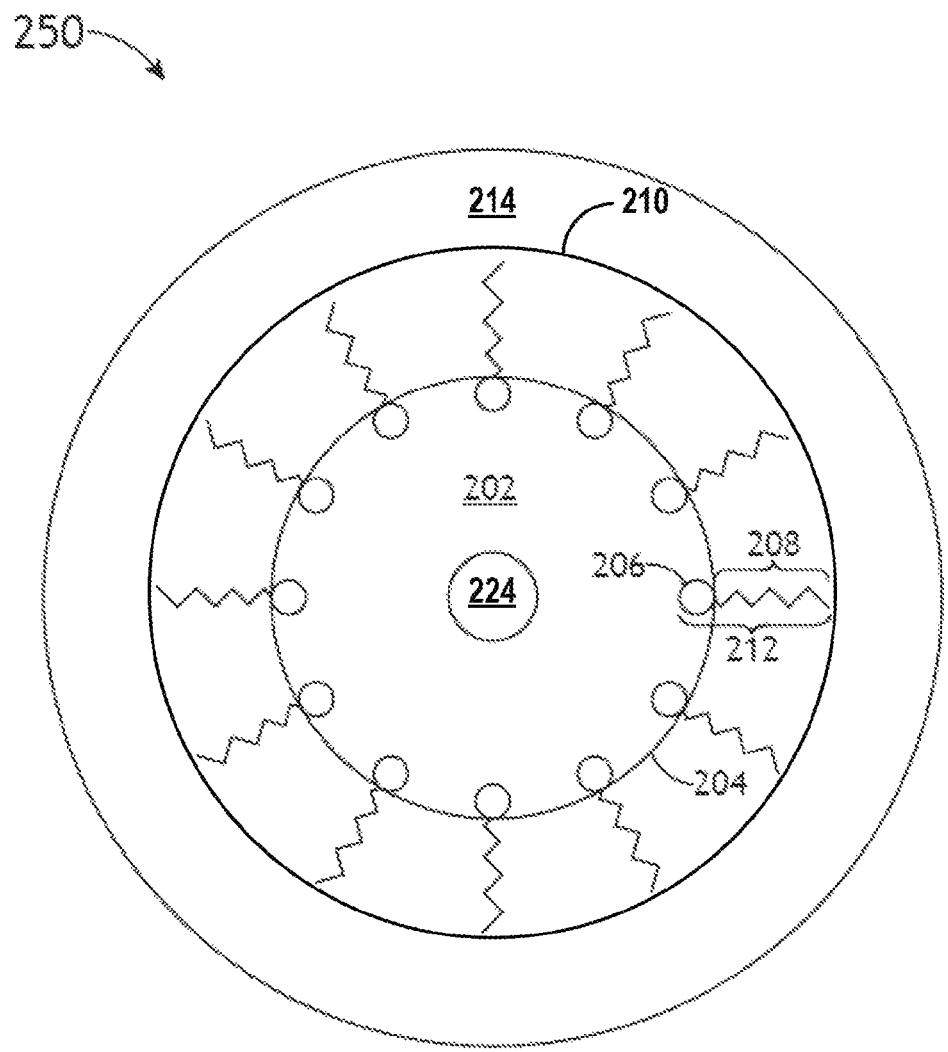

Now referring to FIG. 2B, a plan view of a droplet including a reverse micelle with an internal component is disclosed, in accordance with one or more embodiments of the present disclosure. It is noted herein that the embodiments and components described previously herein with respect to the droplets 150 and 200 should be interpreted to extend to the embodiments described in FIG. 2B.

In embodiments, a droplet 250 may include a hydrophobic portion 210 forming the outer-most layer of the droplet 250. In some embodiments, the droplet 150 may include a hydrophilic portion 202 embedded inside the hydrophobic portion 210. In some embodiments, the droplet 200 may include an amphiphile 212 defining a layer 204 between the hydrophilic portion 202 and the hydrophobic portion 210. For example, the amphiphile 212 may be configured to form a hydrophilic head 206 connected to a hydrophobic tail 208. In some embodiments, the droplet 250 may include an internal component 224 resting within the hydrophilic portion 202. For example, the internal component 224 may be located substantially at the center of the hydrophilic portion 202 of the droplet 250.

It is contemplated that, while the internal component 224 shown in FIG. 2B is represented as one site, such a configuration is merely provided for illustrative purposes. Embodiments of the present disclosure may be configured to include more than one site for the internal component 224 within the hydrophilic portion 202. It is further contemplated that, while the internal component 224 shown in FIG. 2B is substantially located at the center of the hydrophilic portion 202, such a configuration is merely provided for illustrative purposes. Embodiments of the present disclosure may be configured to adapt various locations for the internal component 224 within the hydrophilic portion 202.

It is noted that the internal component 224 shown in FIG. 2B may be soluble in the hydrophilic portion 202 and the solubilized internal component 224 may stay within the hydrophilic portion 202 of the droplet 250.

Figure 3:
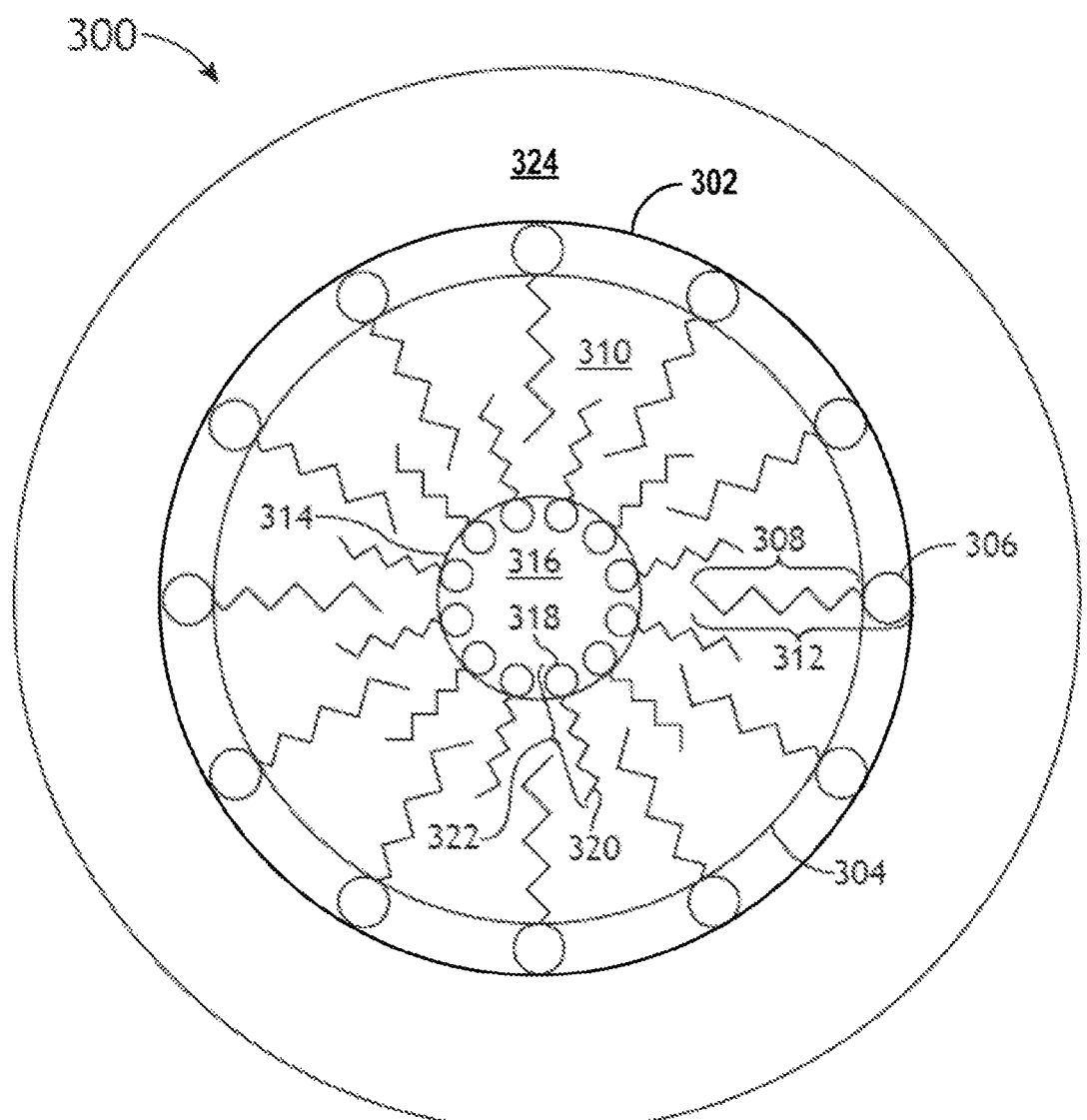

Now referring to FIG. 3, a plan view of a droplet including a bilayer micelle is disclosed, in accordance with one or more embodiments of the present disclosure. It is noted herein that the embodiments and components described previously herein with respect to the droplets 100 and 200 should be interpreted to extend to the embodiments described in FIG. 3.

In some embodiments, an amphiphile (or amphiphiles) make up a layer between the droplet-solution interface and the core of droplet. For example, a droplet 300 may include a first hydrophilic portion 302 forming the most outer layer of the droplet 300. In some embodiments, the droplet 300 may include a hydrophobic portion 310 embedded inside the first hydrophilic portion 302. In some embodiments, the droplet 300 may include a first amphiphile 312 defining a layer 304 between the first hydrophilic portion 302 and the hydrophobic portion 310. For example, the amphiphile 312 may have a first hydrophilic head 306 connected to a first hydrophobic tail 308. For example, the first hydrophilic head 306 of the first amphiphile 312 may be in contact with the first hydrophilic portion 302 and may interface with an aqueous solution 324. The first hydrophobic tail 308 of the first amphiphile 312 may extend away from the first hydrophilic portion 302 and rest within the hydrophobic portion 310.

In some embodiments, the droplet 300 may include a second amphiphile 322 defining a layer 314 between a second hydrophilic portion 316 and the hydrophobic portion 310. For example, the second amphiphile 322 may have a second hydrophilic head 318 connected to a second hydrophobic tail 320. For instance, the second hydrophilic head 318 of the second amphiphile 322 may be in contact with the second hydrophilic portion 316 located at the core of the droplet 300. The second hydrophobic tail 318 of the second amphiphile 322 may extend away from the second hydrophilic portion 316 and rest within the hydrophobic portion 310. In this regard, the second hydrophilic head 318 of the second amphiphile 322 may be sequestered into the middle of the second hydrophilic portion 316 and the second hydrophobic tail 320 of the second amphiphile 322 may extend away from the middle of the second hydrophilic portion 316. The configuration of droplet 300 is shown with hydrophilic head 306 interfacing with aqueous solution 324, however other configurations are contemplated herein. For example, the head 306 of amphiphile 312 may interface with a head 318 of amphiphile 322, such that tail 320 may interface with a nonaqueous solution (not shown).

In some embodiments, the droplet 300 may include a second hydrophilic portion 316. For example, the second hydrophilic portion 316 may be located at the core of the droplet 300. For instance, the second hydrophilic portion 316 located at the core of the droplet 300 may have different compositions than the first hydrophilic portion 302 covering the most outer layer of the droplet 300.

In some embodiments, the droplet 300 includes the first amphiphile 312 creating a layer 304 between the first hydrophilic portion 302 and the hydrophobic portion 310. In some embodiments, the droplet 300 includes the second amphiphile 322 creating a layer 314 between the second hydrophilic portion 316 and the hydrophobic portion 310. In this regard, the droplet 300 may form a bilayer micelle (i.e., liposome) equipped with two layers 304 and 314 formed with the amphiphiles 312 and 322, respectively.

It is noted that, while the droplet 300 shown in FIG. 3 is depicted to include no internal components in the second hydrophilic portion 316, such a configuration is merely provided for illustrative purposes. Embodiments of the present disclosure may be configured to include the internal components in the hydrophilic portion 316 of the droplet 300 such as the solid particles described above.

Figure 4A:
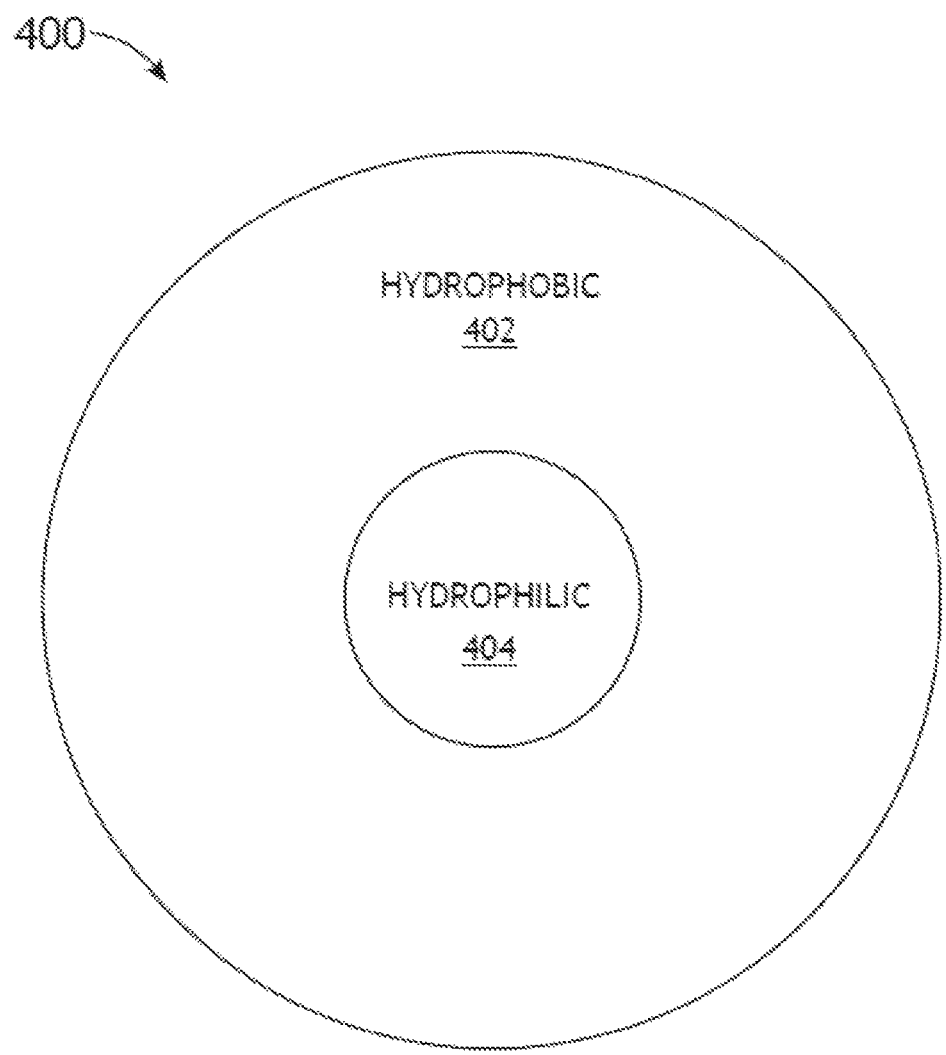
Figure 4B:
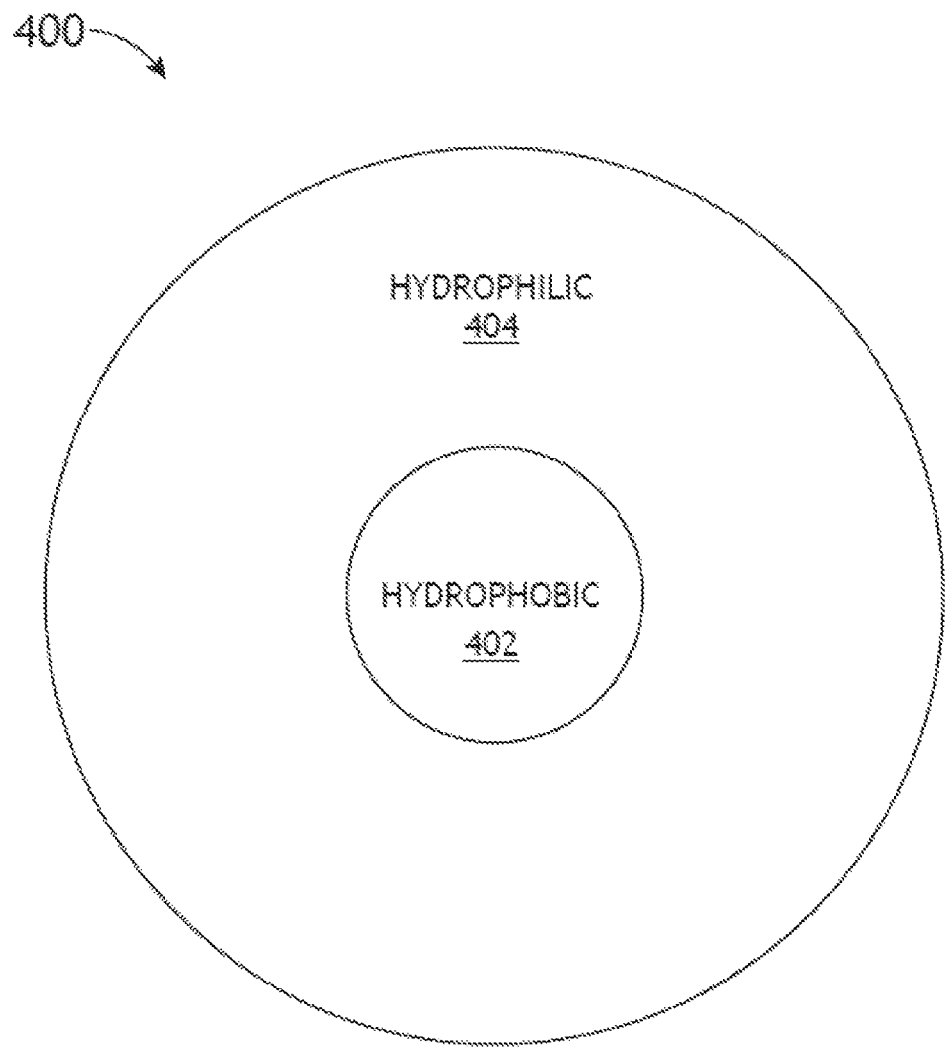

Now referring to FIGS. 4A-4B, a plan view of a droplet is disclosed, in accordance with one or more embodiments of the present disclosure. It is noted herein that the embodiments and components described previously herein with respect to the droplets 100, 150, 200, 250, and 300 should be interpreted to extend to the embodiments described in FIGS. 4A-4B.

In embodiments, a droplet 400 shown in FIG. 4A may include a hydrophobic portion 402 enclosing a hydrophilic portion 404 at the core of the droplet 400. It is noted that, while the hydrophilic portion 404 shown in FIG. 4A is located at the core of the droplet 400, such a configuration is merely provided for illustrative purposes. Embodiments of the present disclosure may be configured to adapt various hydrophilic portion locations within the hydrophobic portion 402.

It is further noted that, while the hydrophilic portion 404 shown in FIG. 4A is depicted as a droplet composition with one hydrophilic portion, such a configuration is merely provided for illustrative purposes. The present disclosure may be configured to adapt more than one hydrophilic portions within the hydrophobic portion 402 to provide necessary physical properties to the composition of droplet 400.

In embodiments, a droplet 450 shown in FIG. 4B may include a hydrophilic portion 404 enclosing a hydrophobic portion 402 at the core of the droplet 450. It is noted that, while the hydrophobic portion 404 shown in FIG. 4B is located at the core of the droplet 450, such a configuration is merely provided for illustrative purposes. Embodiments of the present disclosure may be configured to adapt various hydrophobic portion locations within the hydrophilic portion 404.

It is further noted that, while the hydrophobic portion 402 shown in FIG. 4B is depicted as a droplet composition with one hydrophobic portion, such a configuration is merely provided for illustrative purposes. The present disclosure may be configured to adapt more than one hydrophobic portions within the hydrophilic portion 404 to provide necessary physical properties to the composition of droplet 450.

It is noted that the droplets 400 and 450 may easily be formed by an apparatus described in U.S. Pat. No. 9,148,994.

Figure 5:
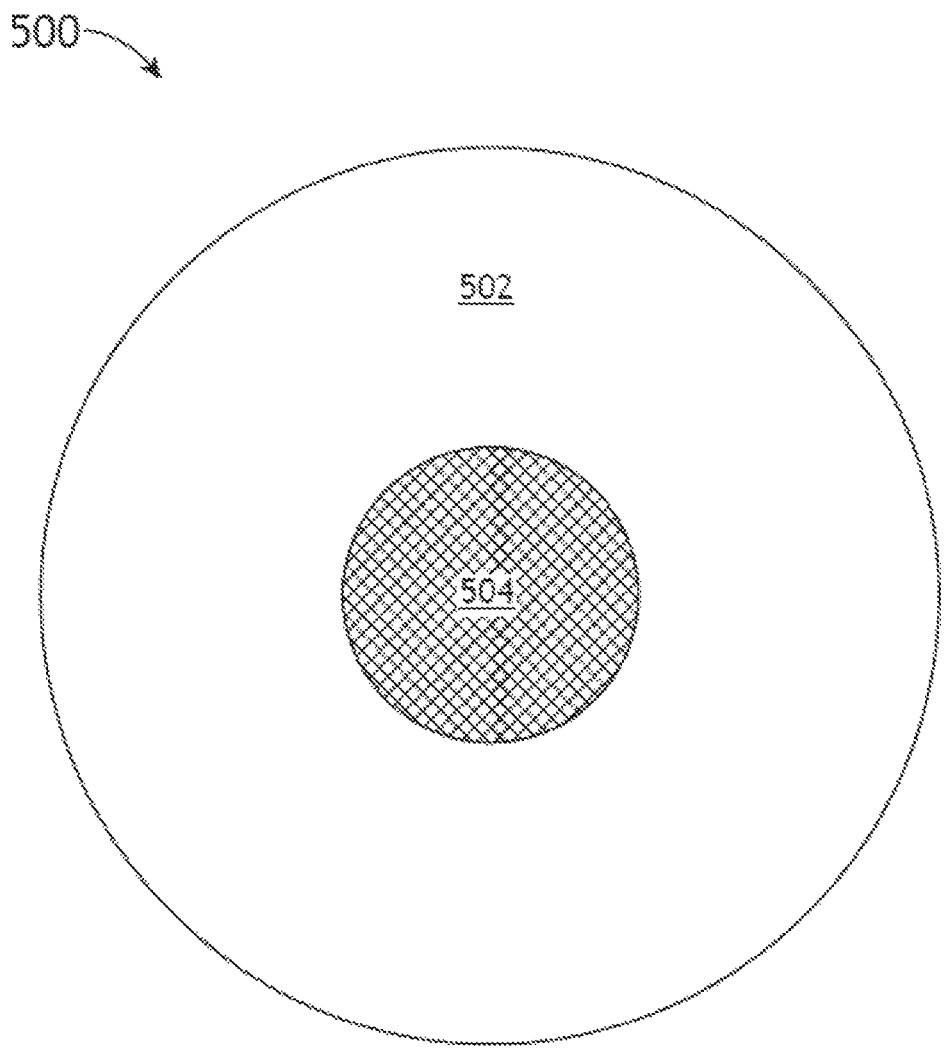

Now referring to FIG. 5, a plan view of a droplet is disclosed, in accordance with one or more embodiments of the present disclosure. It is noted herein that the embodiments and components described previously herein with respect to the droplets 100, 150, 200, 250, 300, 400, and 450 should be interpreted to extend to the embodiments described in FIG. 5.

In embodiments, a droplet 500 may include a hydrophobic portion 502 enclosing an internal gas-phase pocket 504. For example, the internal gas-phase pocket 504 may include a gas-phase compound capable of providing increased flavor, increased shelf-life (e.g., due to its encapsulation), other desirable characteristics to the droplet 500. The internal gas-phase pocket 504 may include, but is not limited to, a flavanoid, isobutyric acid, ethanol, or combinations thereof.

It is noted that, while the internal gas-phase pocket 504 shown in FIG. 5 is located at the core of the droplet 500, such a configuration is merely provided for illustrative purposes. Embodiments of the present disclosure may be configured to adapt various internal gas pocket locations within the hydrophobic portion 502.

It is further noted that, while the internal gas-phase pocket 504 shown in FIG. 5 is depicted as one internal gas pocket, such a configuration is merely provided for illustrative purposes. The present disclosure may be configured to adapt more than one internal gas-phase pockets within the hydrophobic portion 502 to provide necessary physical properties to the composition of droplet 500.

Figure 6:
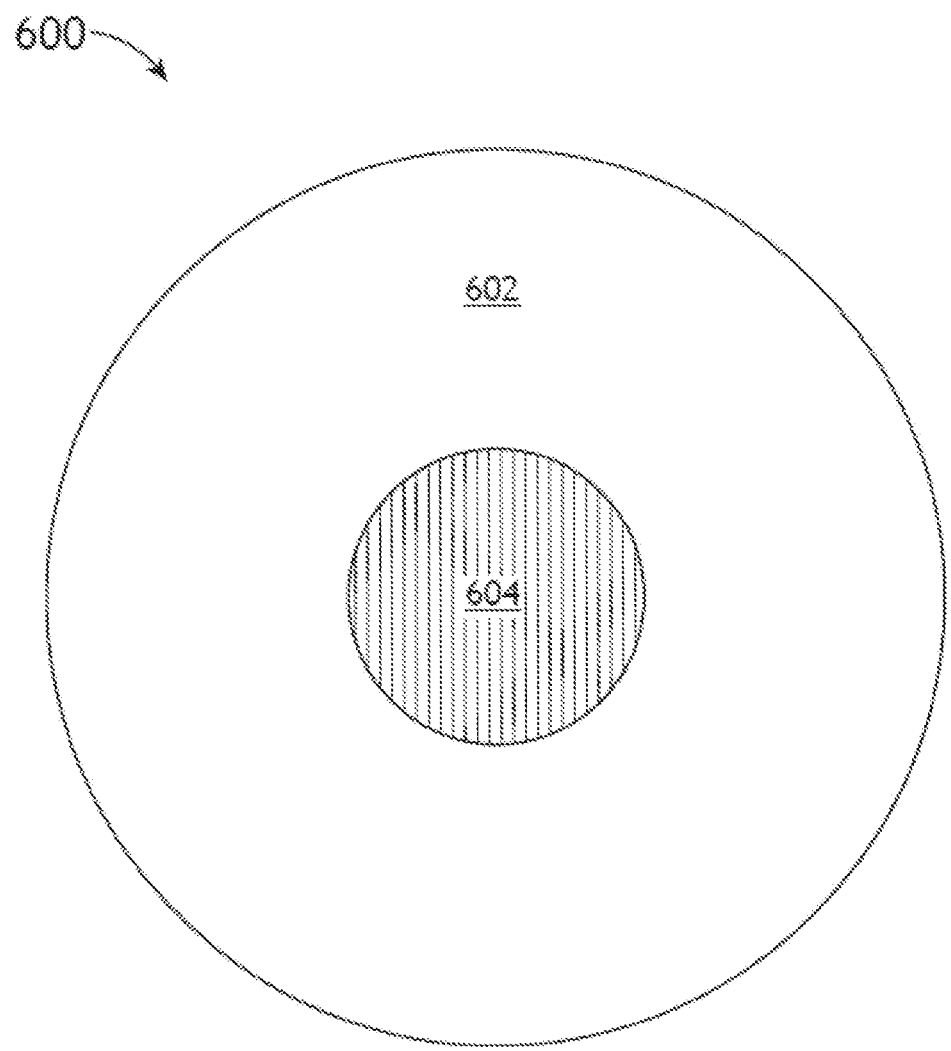

Now referring to FIG. 6, a plan view of a droplet is disclosed, in accordance with one or more embodiments of the present disclosure. It is noted herein that the embodiments and components described previously herein with respect to the droplets 100, 150, 200, 250, 300, 400, 450, and 500 should be interpreted to extend to the embodiments described in FIG. 6.

In embodiments, a droplet 600 may include a hydrophobic portion 602 enclosing an internal component 604. For example, the internal component 604 may rest in the hydrophobic portion 602. For example, the internal component 604 (e.g., sugar crystal, etc.) may be located substantially at the center of the hydrophobic portion 602 of the droplet 600.

It is noted that, while the internal component 604 shown in FIG. 6 is located at the core of the droplet 600, such a configuration is merely provided for illustrative purposes. Embodiments of the present disclosure may be configured to adapt various internal component locations within the hydrophobic portion 602.

It is further noted that, while the internal component 604 shown in FIG. 6 is depicted as one internal component, such a configuration is merely provided for illustrative purposes. The present disclosure may be configured to adapt more than one internal component within the hydrophobic portion 602 to provide necessary physical properties to the composition of droplet 600.

In embodiments, size of the droplets 100, 150, 200, 250, 300, 400, 450, 500, and 600 may vary depending on an application. For example, in some encapsulation applications drop sizes may range from 20 to 800 microns in diameter, where the size distribution is based on a mean diameter (e.g., adding together a diameter of each drop from a spray sample and dividing that sum by a total number of drops in the sample). By way of another example, for some nutraceutical, flavoring, or antimicrobial coatings, a mean drop size may range from 15 to 80 microns in diameter. By way of another example, microencapsulation of acetic or ascorbic acid may result a mean drop size from 300 to 350 microns.

Figure 7A:
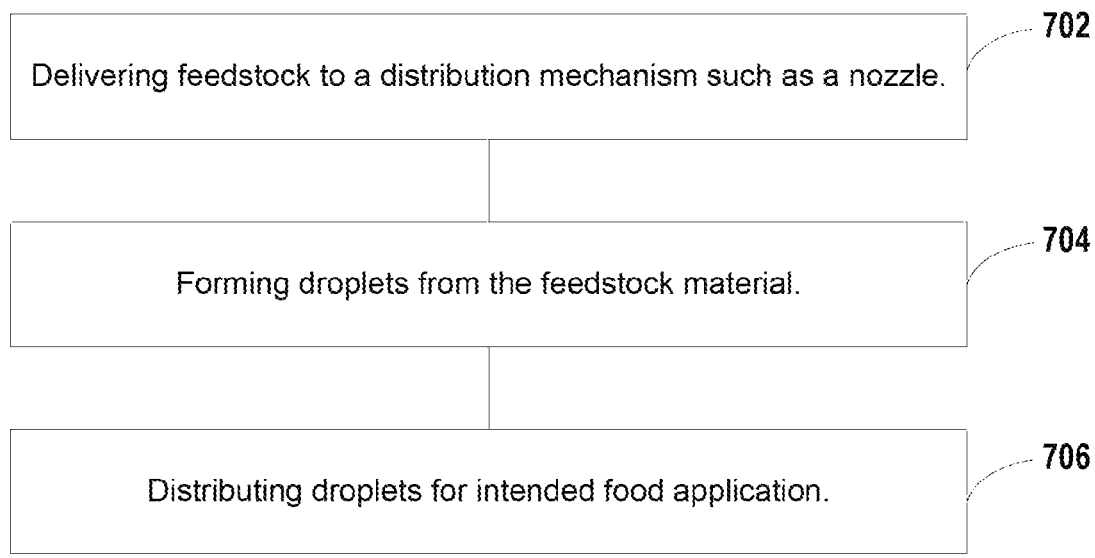
Figure 7B:
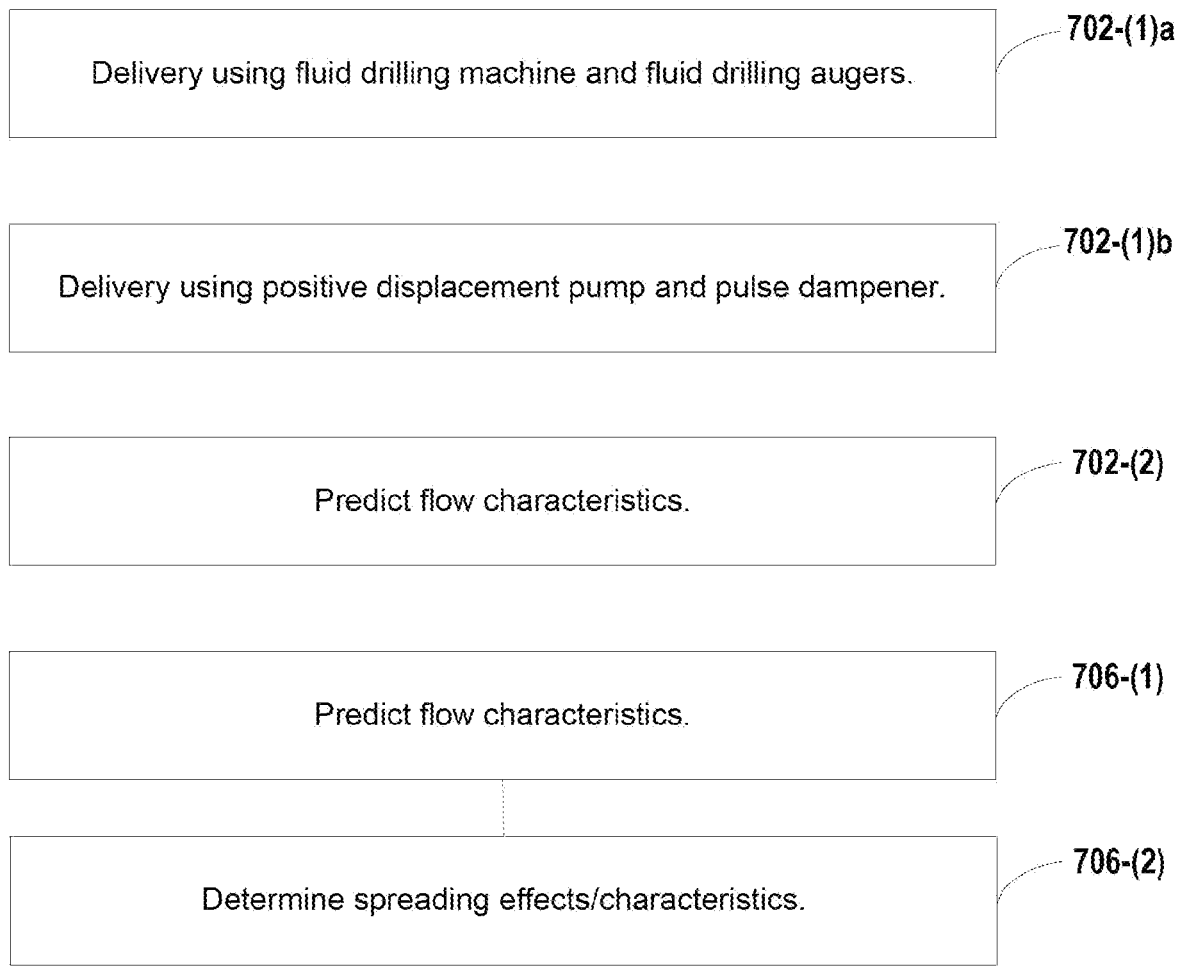

Referring now to FIG. 7, an exemplary embodiment of a method 700 according to the inventive concepts disclosed herein may include one or more of the following steps.

A step 702 may include delivering feedstock to a distribution mechanism such as a nozzle. In embodiments, the delivery of feedstock to the distribution mechanism is at a low pressure (e.g., 1-15 psi). For example, referring now to FIG. 8, a step 702-(1)a may include delivery with a low pressure delivery mechanism such as a fluid drilling machine that uses one or more fluid drilling augers may be used to deliver feedstock to a spray nozzle. By way of another example, step 702-(1)b may include delivery using a low pressure peristaltic pump may be used. However, the use of the peristaltic pump is not limiting, as delivery may take place using any positive displacement pump. In this regard, it is noted that many positive displacement pumps result excessive cavitation, detrimentally affecting the integrity of the pump or other components of a distribution or delivery mechanism. Therefore, in some embodiments, a pulse dampener is used to aid in delivery of the feedstock to a distribution mechanism.

Figure 9:
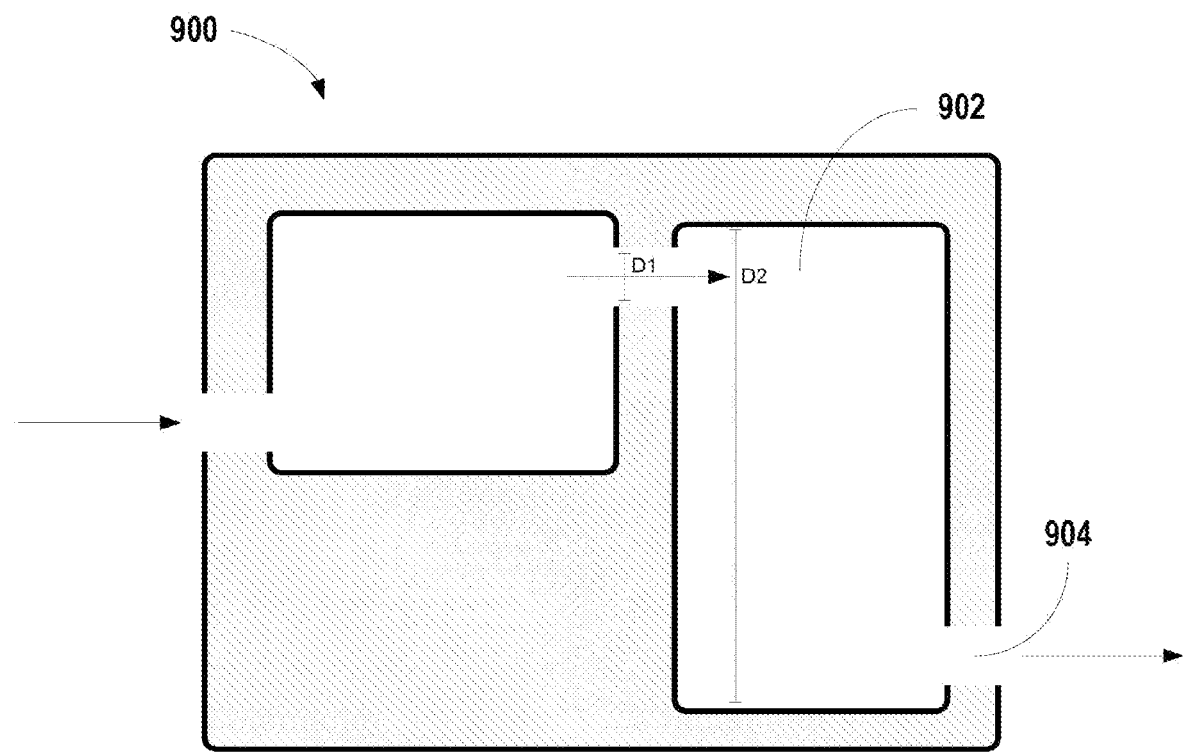

Referring now to FIG. 9, a sectional view of an embodiment of a pulse dampener 900 is depicted. Pulse dampener 900 may include one or more cavities 902 and one or more channels 904. In some embodiments, the pulse dampener 900 includes multiple channels successively coupled using multiple channels 904. In this regard, flow from the positive displacement pump may enter a first channel 904 and exit a last channel 904, where one or more channels 904 may be between the first and the last channel 904. It is further noted that although channels 904 are depicted as having parallel sides, this depiction is not limiting. For example, in some embodiments, the channels 904 may have contracting sides or expanding sides (e.g., sides configured to contract or expand fluid flowing through them).

It is noted that a step 702-(2) may include using a formula, model, or relationship to predict flow characteristics. For example, Bernoulli's Equation may be used to understand and predict flow characteristics into, through, and out of the pulse dampener 900, according to the following:

$$\Delta\left(\frac{P}{\rho} + gz + \frac{V^2}{2}\right) = \frac{dW_{n.f.}}{dm} - \mathscr{F}$$

where $\mathcal{F}$ is the friction heating term per unit mass. In embodiments, the friction heating term may be proportional to diameter of the channel 904 and diameter (e.g., or height) of chamber 902 according to the following:

$$\mathcal{F} = K\frac{V^2}{2}$$

where K is the resistance coefficient, V is the largest of the two velocities. In embodiments incorporating a sudden expansion or enlargement K may be related to the two pipe diameters (e.g., entrance pipe and chamber pipe, or height of chamber) according to the following:

$$K = \left[1 - \frac{D_1^2}{D_2^2}\right]^2$$

For example, flow entering channel 904 from a positive displacement pump may flow into a first cavity 902 where it encounters a large mass of fluid within the cavity 902. This encounter of flow with a large mass results a number of random/chaotic eddies. Not only do these eddies help to transfer kinetic-pulsating energy resulting from the pump, but they also help enable further mixing, which may contribute to emulsion formation. Using Bernoulli's Equation and a point near the fluid entrance and a point far from the fluid entrance, where velocity is negligible, a relationship of fluid flow characteristics is determined according to the following:

$$P_2 - P_1 = \frac{\rho V_1^2}{2} - \rho \mathcal{F}$$

The above equation assumes that the potential energy term is negligible. As this is not always the case in pulse dampener 900, other forms of Bernoulli's equation may be derived. Further, as the channels may gradually contract or expand, instead of using sudden contraction and/or expansion, the forms Bernoulli's equation may take may again vary.

Figure 10:
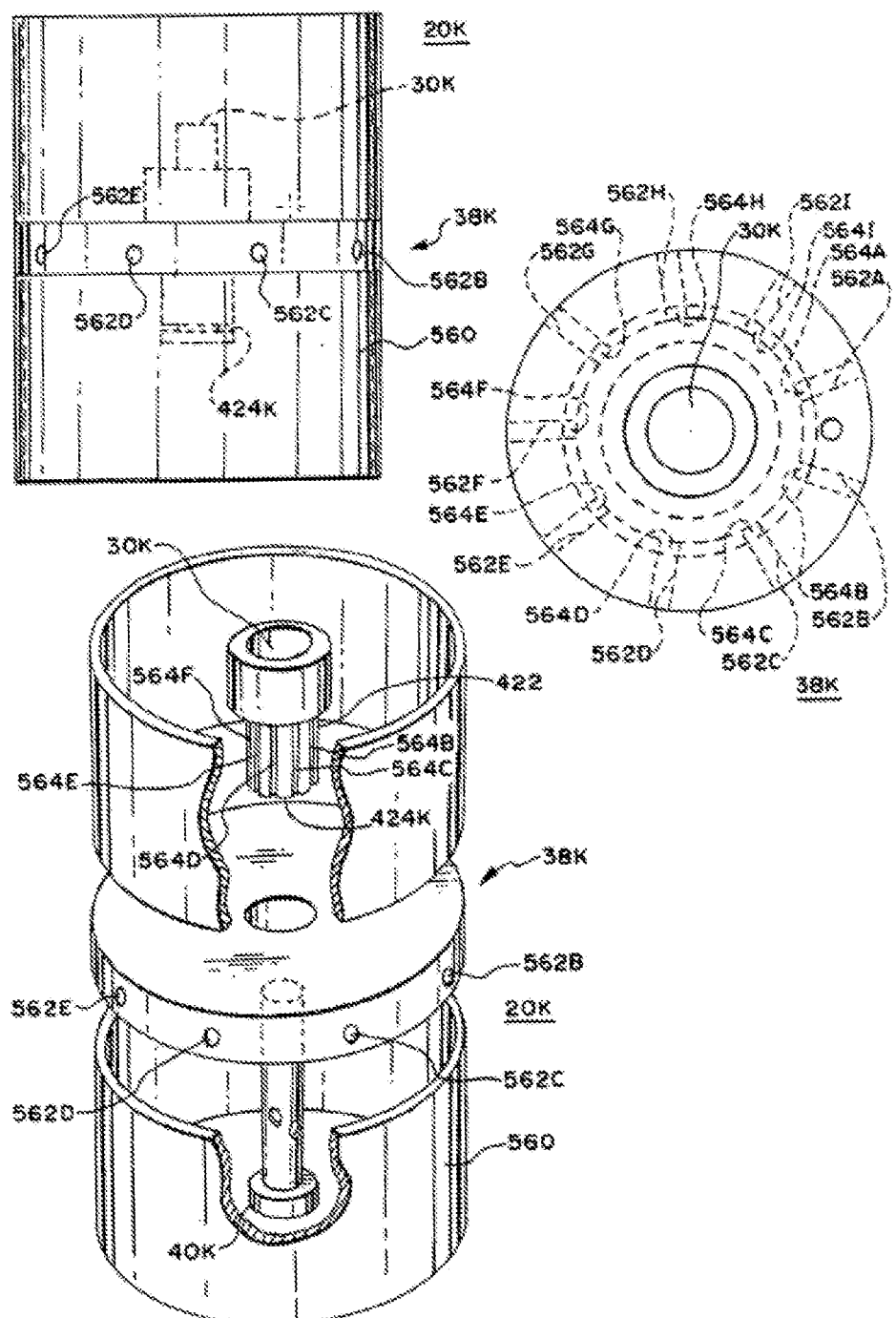
Figure 11:
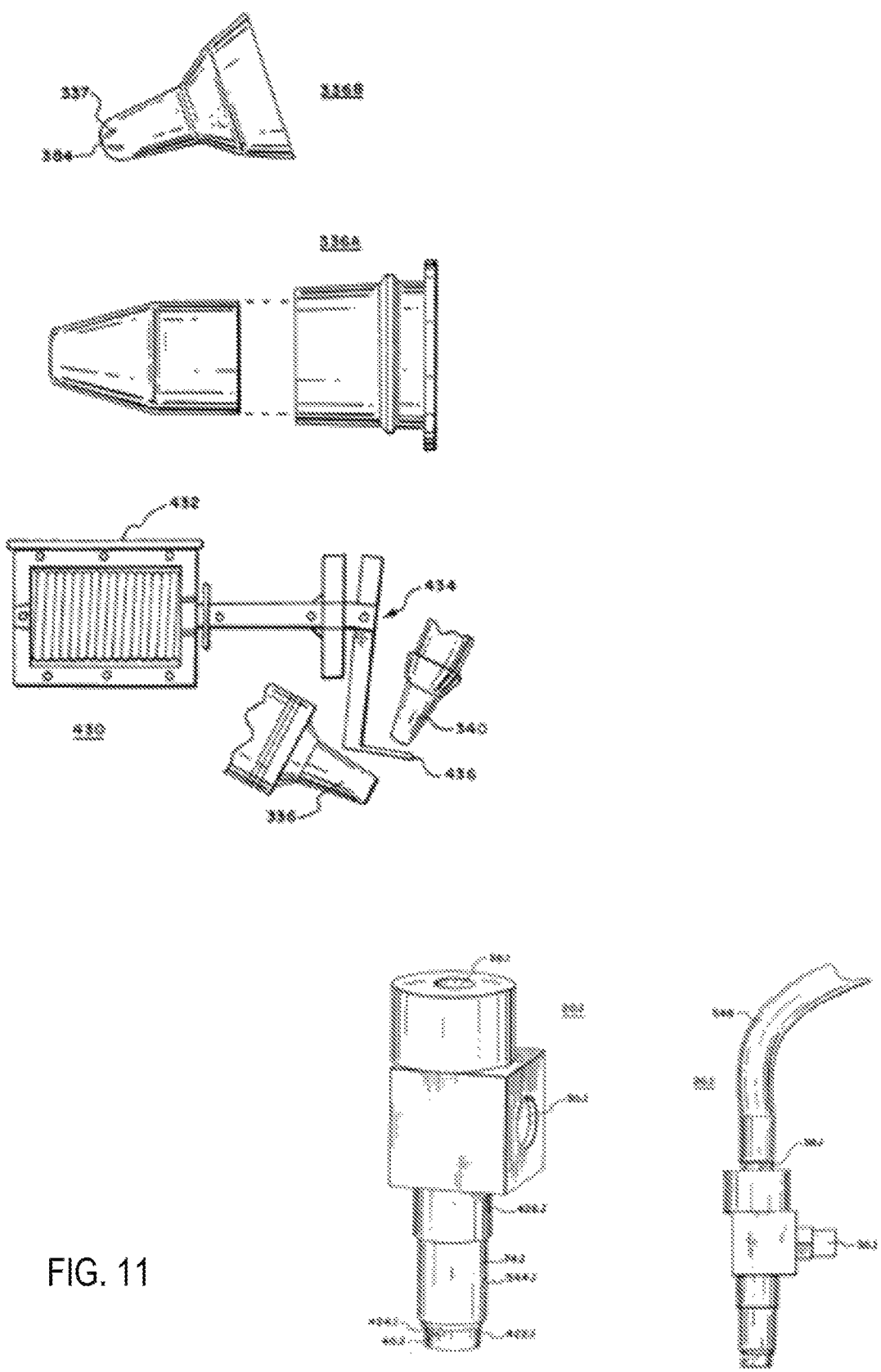

A step 704 may include forming droplets from the feedstock material. For example, the feedstock may be delivered from the delivery mechanism (e.g., pump, fluid drilling machine, etc.), and to a distribution mechanism. For instance, referring now to FIGS. 10 and 11, one or more nozzles may be used as the distribution mechanism. In this regard, the one or more nozzles may include an adjustable plate to adjust a size or shape of the droplets formed. Further, a temperature of the feedstock entering the one or more nozzles may also be adjustable (e.g., via heating feedstock at a hopper or along transport to nozzle). Further, viscosity of the feedstock entering the one or more nozzles may be adjustable (e.g., via heating, or via the addition of a viscosity modifier). Further, pressure of the feedstock entering the distribution mechanism may be adjusted (e.g., via increasing pressure at the pump or at the fluid drilling machine, or by contracting a contracting plate or surface). Further, a flow rate of the feedstock may be adjusted (e.g., via increasing speed of pump or speed of fluid drilling augers). Further, as discussed above, formation of droplets and/or droplet size or configuration may also be affected by the various elements or compounds formulated within the droplet 100 (e.g., use of multiple surfactants may result different drop size/configuration than a single surfactant; pH may affect drop size/configuration; or ionic or nonionic nature of droplet compounds may affect drop size/configuration).

Figure 12:
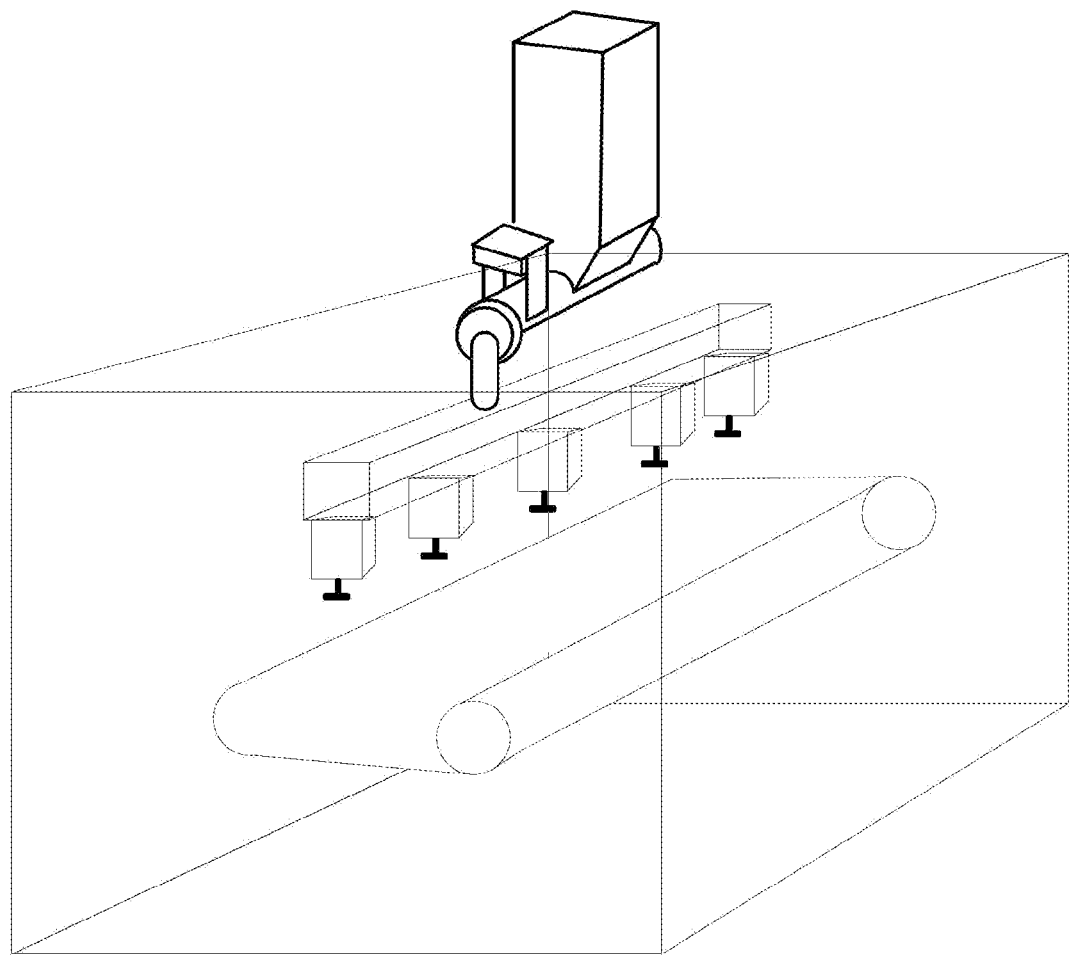

A step 706 may include distributing the droplets formed in step 704 (e.g., droplet 100) for the intended food application. For example, the droplet 100 may be intended to coat a dough for baking bread and may include one or more spices for flavoring the bread. By way of another example, the droplet 100 may be intended to coat a nut or other edible seed (e.g., corn nut). In some embodiments, the distribution mechanism (e.g., nozzle) and/or the delivery mechanism (e.g., fluid drilling machine) may be attached to, or incorporated with, a conveyor system as depicted in FIG. 12. In embodiments, the conveyor system may be incorporated in food preparation process (e.g., cooking as with an oven, packaging, etc.).

It is noted that step 706-(1) may include determining the flow characteristics of feedstock exiting a nozzle. In this regard, a sudden expansion form of Bernoulli's Equation may be utilized.

A step 706-(2) may include determining a spreading effect of the droplet onto a surface (e.g., food surface). In embodiments, spreading may be determined according to multiple dimensionless numbers. For example, spreading may be determined by the Reynolds Number, the Weber Number, and the Ohnesorge Number, according to the following:

Weber $N_{We} = \rho u^2 d/\sigma$

Reynolds $N_{Re} = du\rho/\mu$

Ohnesorge $N_{Oh} = \sqrt{We}/Re$

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A droplet, comprising:
   a core having a viscosity equal to or less than 0.002 kg/m·s (2.0 cP);
   a coating having a viscosity greater than 0.002 kg/m·s (2.0 cP);
   at least one of a micelle or reverse micelle, wherein the micelle or reverse micelle comprises an amphiphile, wherein the amphiphile forms at least one of the core or the coating;
   a zwitterionic compound;
   at least one of an extensional viscosity modifier or a viscosity modifier;

a hydrophobic portion; and a hydrophilic portion, wherein the droplet is configured for application onto a food surface.

2. The droplet of claim 1, wherein the droplet has a mean diameter from 20 to 800 microns in diameter.

3. The droplet of claim 1, wherein the droplet has a mean diameter from 15 to 80 microns in diameter.

4. The droplet of claim 1, wherein the droplet has a mean diameter from 300 to 350 microns in diameter.

5. The droplet of claim 1, wherein the zwitterionic compound comprises lecithin.

6. The droplet of claim 1, wherein the amphiphile comprises the coating of the droplet.

7. The droplet of claim 6, wherein the coating of the droplet comprises a high viscosity fluid having a viscosity greater than 0.002 kg/m·s (2.0 cP).

8. The droplet of claim 1, wherein the amphiphile comprises the core of the droplet.

9. The droplet of claim 8, wherein the core of the droplet comprises a low viscosity fluid having a viscosity less than 0.002 kg/m·s (2.0 cP).

10. The droplet of claim 1, wherein the droplet is formed by delivering a feedstock via a delivery mechanism to a distribution mechanism configured as a spray fixture for receiving the feedstock and a kinetic energy fluid pressurized between zero psi and ten psi.

11. The droplet of claim 10, wherein the delivery mechanism is configured as at least one of a fluid drilling auger, a positive displacement pump, or a peristaltic pump.

12. The droplet of claim 10, wherein the delivery mechanism further includes a pulse dampener.

13. The droplet of claim 1, wherein the extensional viscosity modifier comprises at least one of polyethylene oxide (PEO), polyethylene glycol (PEG), carboxylmethylcellulose, or a non-Newtonian fluid.

* * * * *